United States Patent
Eliu et al.

(10) Patent No.: US 7,482,438 B2
(45) Date of Patent: Jan. 27, 2009

(54) CATIONIC IMIDAZOLAZO DYES CONTAINING A 2,5-DIAMINOPHENYL MOIETY

(75) Inventors: Victor Paul Eliu, Lörrach (DE); Thomas Sauder, Basel (CH); Dominique Kauffmann, Illzach (FR); Beate Fröhling, Steinen (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 311 days.

(21) Appl. No.: 10/594,047

(22) PCT Filed: Mar. 23, 2005

(86) PCT No.: PCT/EP2005/051323
§ 371 (c)(1),
(2), (4) Date: Sep. 25, 2006

(87) PCT Pub. No.: WO2005/095522
PCT Pub. Date: Oct. 13, 2005

(65) Prior Publication Data
US 2007/0214580 A1    Sep. 20, 2007

(51) Int. Cl.
*C09B 29/00* (2006.01)
*A61Q 5/10* (2006.01)
*D06P 1/08* (2006.01)

(52) U.S. Cl. ............................ 534/558; 8/405; 8/425

(58) Field of Classification Search ............ 534/560, 534/574; 548/333; 252/187.23; 8/405, 425
See application file for complete search history.

(56) References Cited

U.S. PATENT DOCUMENTS

| | | | | |
|---|---|---|---|---|
| 4,294,756 A | 10/1981 | Kühlthau | ............ | 260/163 |
| 5,733,343 A | 3/1998 | Möckli | ............ | 8/426 |
| 6,762,287 B2 * | 7/2004 | Mockli | ............ | 534/607 |
| 2003/0066143 A1 | 4/2003 | Möckli | ............ | 8/405 |
| 2003/0177591 A1 | 9/2003 | Möckli | ............ | 8/405 |
| 2004/0049020 A1 | 3/2004 | Möckli | ............ | 534/767 |
| 2005/0091764 A1 | 5/2005 | Möckli | ............ | 8/405 |
| 2005/0120493 A1 | 6/2005 | Möckli | ............ | 8/405 |
| 2006/0179586 A1 * | 8/2006 | Eliu et al. | ............ | 8/406 |

FOREIGN PATENT DOCUMENTS

| | | |
|---|---|---|
| DE | 3724642 | 2/1989 |
| EP | 1366756 | 12/2003 |
| GB | 2412916 A * | 10/2005 |

OTHER PUBLICATIONS

English language abstract for DE 3724642, Feb. 2, 1989.
English language abstract for EP 1366756, Dec. 3, 2003.

* cited by examiner

*Primary Examiner*—David R Sample
*Assistant Examiner*—Katie Hammer
(74) *Attorney, Agent, or Firm*—Tyler A. Stevenson

(57) ABSTRACT

Disclosed are azo dyes of formula (1), wherein $R_1$ is hydrogen; $C_1$-$C_{14}$alkyl; hydroxy-$C_1$-$C_{14}$alkyl; $C_2$-$C_{14}$alkenyl; a radical of formula (1a) —$(CH_2)_{n1}$—O—$(CH_2)_{n2}$—$CH_3$; a radical of formula (1b) $C_{10}$aryl; or $C_6$-$C_{10}$aryl-$C_1$-$C_6$alkyl; R3 is hydrogen; $C_1$-$C_{14}$alkyl; $C_2$-$C_{14}$alkenyl; $C_6$-$C_{10}$aryl; $C_6$-$C_{10}$aryl-$C_1$-$C_6$alkyl; or CO—$R_6$; $R_4$ is CO—$R_6$; $R_5$ is $C_1$-$C_{14}$alkyl; $C_2$-$C_{14}$alkenyl; $C_6$-$C_{10}$aryl; or $C_6$-$C_{10}$aryl-$C_1$-$C_6$alkyl; $R_6$ is hydrogen; $C_1$-$C_{14}$alkyl; $C_2$-$C_{14}$alkenyl; or $C_6$-$C_{10}$aryl; $R_7$, $R_8$, $R_9$ and $R_{10}$, independently from each other are hydrogen; or $C_1$-$C_5$alkyl; m is 1; or 2; An⁻ is an anion; If m=1, $R_2$ is hydrogen; $C_1$-$C_{14}$alkyl; $C_2$-$C_{14}$alkenyl; a radical of formula (1a); a radical of formula (1b); $C_6$-$C_{10}$aryl; or $C_6$-$C_{10}$aryl-$C_1$-$C_6$alkyl; If m=2, $R_2$ is the direct bond; or $C_1$-$C_{14}$alkylene, which is optionally substituted by one or more $C_1$-$C_4$alkyl, or which is optionally interrupted by $C_5$-$C_{10}$arylene, —O— or —$NR_9R_{10}$—; $R_9$ and $R_{10}$, independently from each other are hydrogen; or $C_1$-$C_5$alkyl; and n1, n2, n3 and n4, independently from each other are a number from 0 to 5. The compounds are useful for the dyeing of organic material, preferably human hair.

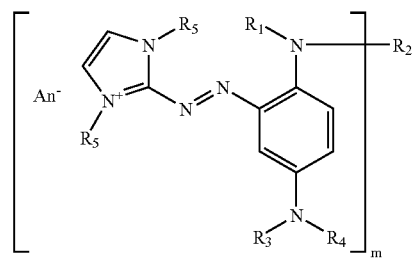

22 Claims, No Drawings

CATIONIC IMIDAZOLAZO DYES CONTAINING A 2,5-DIAMINOPHENYL MOIETY

The present invention relates to novel 2,5-diamino substituted azo dyes, compositions comprising these compounds, to a process for their preparation and to their use for dyeing of organic materials, such as keratin-containing fibers, wool, leather, silk, cellulose or polyamides, especially keratin-containing fibers, cotton or nylon, preferably hair, and more preferably human hair.

It is known, for example from WO 95/01772 that cationic dyes can be used for the dyeing of organic materials. This class of dyes exhibits very brilliant shades. A disadvantage however is their unsatisfactory fastness to hydrolysis and to light, their frequently inadequate stability under reducing or oxidizing conditions, and their frequently unsatisfactory storage stability (see: John F. Corbett: "The Chemistry of Hair-Care Products", JSCD August 1976, p. 290). In addition, there is a need for dyeing hair with compounds which give access to the blue color spectrum The problem of the present invention is to provide dyes, especially blue dyes for the dyeing of organic materials that are distinguished by deep dyeing and simultaneously having good fastness properties with respect to washing, light, shampooing and rubbing, and which preferably exhibit satisfactory stability under reducing or oxidizing dyeing conditions.

Accordingly, the present invention relates to 2,5-diamino substituted azo dyes of formula

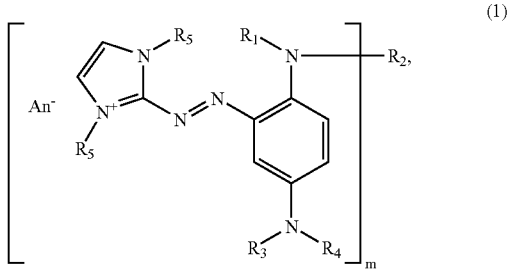

(1)

wherein
$R_1$ is hydrogen; $C_1$-$C_{14}$alkyl; hydroxy-$C_1$-$C_{14}$alkyl; $C_2$-$C_{14}$alkenyl; a radical of formula (1a) —$(CH_2)_{n1}$—O—$(CH_2)_{n2}$—$CH_3$; a radical of formula (1b)

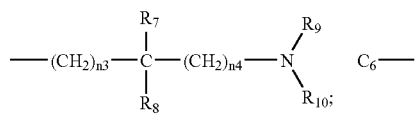

$C_{10}$aryl; or $C_6$-$C_{10}$aryl-$C_1$-$C_6$alkyl;
$R_3$ is hydrogen; $C_1$-$C_{14}$alkyl; $C_2$-$C_{14}$alkenyl; $C_6$-$C_{10}$aryl ; $C_6$-$C_{10}$aryl-$C_1$-$C_6$alkyl; or CO—$R_6$;
$R_4$ is CO—$R_6$;
$R_5$ is $C_1$-$C_{14}$alkyl; $C_2$-$C_{14}$alkenyl; $C_6$-$C_{10}$aryl; or $C_6$-$C_{10}$aryl-$C_1$-$C_6$alkyl;
$R_6$ is hydrogen; $C_1$-$C_{14}$alkyl; $C_2$-$C_{14}$alkenyl; or $C_6$-$C_{10}$aryl;
$R_7$, $R_8$, $R_9$ and $R_{10}$, independently from each other are hydrogen; or $C_1$-$C_5$alkyl;
m is 1; or 2;
An⁻ is an anion;

If m=1,
$R_2$ is hydrogen; $C_1$-$C_{14}$alkyl; $C_2$-$C_{14}$alkenyl; a radical of formula (1a); a radical of formula (1b); $C_6C_{10}$aryl; or $C_6$-$C_{10}$aryl-$C_1$-$C_6$alkyl;
If m=2,
$R_2$ is the direct bond; or $C_1$-$C_{14}$alkylene, which is optionally substituted by one or more $C_1$-$C_4$alkyl, or which is optionally interrupted by $C_5$-$C_{10}$arylene, —O— or —$NR_9R_{10}$—;
$R_9$ and $R_{10}$, independently from each other are hydrogen; or $C_1$-$C_5$alkyl; and
n1, n2, n3 and n4, independently from each other are a number from 0 to 5.

$C_1$-$C_{14}$alkyl is for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl, n-octyl, 1,1',3,3'-tetramethylbutyl or 2-ethylhexyl, nonyl, decyl, undecy, dodecyl, tredecyl or tetradecyl.

$C_2$-$C_{14}$alkenyl is for example allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-dodec-2-enyl or n-octadec-4-en The formulae (1a) und (1b) are for example —$(CH_2)_2$—O—$CH_2CH_3$, —$(CH_2)_2$—O—$CH_3$, —$CH_2$—O—$CH_3$, —$(CH_2)_3$—O—$CH$—$(CH_3)_2$, —$(CH_2)_2$—N—$(CH_3)_2$, —$(CH_2)_2$—NH—$CH_3$, —$CH_2$—$C(CH_3)_2$—$CH_2$—N$(CH_3)_2$, or —$(CH_2)_2$—NH—$CH_3$.

Aryl is for example naphthyl or phenyl, which may be substituted by one or more hydroxy, amino, halogen or $C_1$-$C_5$alkyl.

Halide is for example, fluoride, chloride, bromide or iodide, especially chloride and fluoride.

"Anion" denotes for example an organic or inorganic anion, such as a halide, preferably chloride and fluoride, sulfate, hydrogen sulfate, phosphate, boron tetrafluoride, carbonate, bicarbonate, oxalate or $C_1$-$C_8$alkyl sulfate, especially methyl sulfate or ethyl sulfate; anion also denotes lactate, formiate, acetate, propionate or a complex anion, such as the zinc chloride double salt.

Preference is given to dyes of formula (1), wherein the anion is is selected from a halide, sulfate, hydrogen sulfate, phosphate, boron tetrafluoride, carbonate, bicarbonate, oxalate or $C_1$-$C_8$alkyl sulfate, lactate, formate, acetate, propionate and a complex anion.

Preferred are dyes of formula (1), wherein
$R_1$ is hydrogen; or $C_1$-$C_{14}$alkyl;
$R_3$ is hydrogen; or $C_1$-$C_{14}$alkyl;
$R_4$ is CO—$R_6$;
$R_5$ is $C_1$-$C_{14}$alkyl;
$R_6$ is hydrogen; $C_1$-$C_{14}$alkyl; or $C_6$-$C_{10}$aryl;
m is 1; or 2;
An⁻ is an anion;
If m=1,
$R_2$ is hydrogen; $C_1$-$C_{14}$alkyl; hydroxy-$C_1$-$C_{14}$alkyl a radical of formula (1a); or a radical of formula (1b);
if m=2,
$R_2$ is the direct bond; or $C_1$-$C_{12}$alkylene, which is optionally substituted by one or more $C_1$-$C_4$alkyl or interrupted by —O—, or $NR_9R_{10}$; and
$R_9$ and $R_{10}$ independently from each other are hydrogen; or $C_1$-$C_5$alkyl.

More preferred are dyes of formula

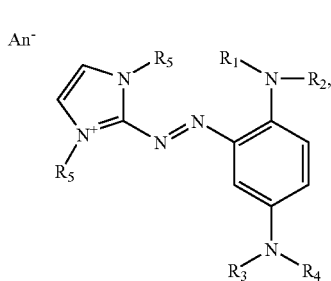
(2)

wherein
$R_1$ is hydrogen; or $C_1$-$C_{14}$alkyl;
$R_2$ is hydrogen; $C_1$-$C_{14}$alkyl; a radical of formula (1a); or a radical of formula (1b);
$R_3$ is hydrogen; or $C_1$-$C_{14}$alkyl;
$R_4$ is CO—$R_6$;
$R_5$ is $C_1$-$C_{14}$alkyl; and
$R_6$ is hydrogen; $C_1$-$C_{14}$alkyl; or $C_6$-$C_{10}$aryl; and
An⁻ is an anion;
and most preferred are dyes of formula (2), wherein
$R_1$ is hydrogen; or $C_1$-$C_4$alkyl;
$R_2$ is $C_1$-$C_{14}$alkyl; a radical of formula (1a); or a radical of formula (1b);
An⁻ is an anion;
$R_3$ is hydrogen; or $C_1$-$C_4$alkyl;
$R_4$ is CO—$R_6$;
$R_5$ and $R_6$ independently from each other are is $C_1$-$C_4$alkyl $C_1$-$C_4$alkyl.

Of very most interest are dyes of formula (2), wherein
$R_1$ is hydrogen; or $C_1$-$C_4$alkyl;
$R_2$ is $C_1$-$C_{12}$alkyl; a radical of formula (1a); or a radical of formula (1b);
An⁻ is an anion;
$R_3$ is hydrogen; or $C_1$-$C_4$alkyl;
$R_4$ is CO—$CH_3$; and
$R_5$ is $C_1$-$C_4$alkyl.

Furthermore, dyes of formula

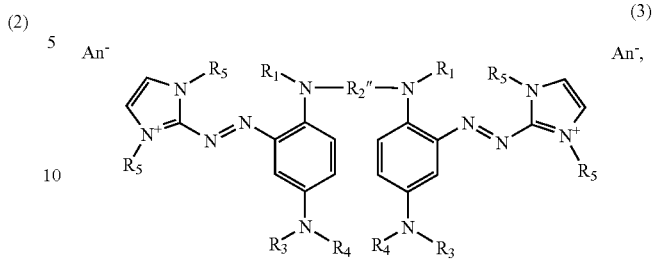
(3)

wherein
$R_1$ is hydrogen; or $C_1$-$C_{14}$alkyl;
$R_2$ is the direct bond; or $C_1$-$C_{14}$-alkylene, which is optionally substituted by one or more $C_1$-$C_4$alkyl;
$R_3$ is hydrogen; or $C_1$-$C_{14}$alkyl;
$R_4$ is CO—$R_6$;
$R_5$ is $C_1$-$C_{14}$alkyl;
$R_6$ is hydrogen; or $C_1$-$C_{14}$alkyl; or $C_6$-$C_{10}$aryl; and
An⁻ is an anion:
are preferred.

More preferred are dyes of formula (3), wherein
$R_1$ is hydrogen; or $C_1$-$C_4$alkyl;
$R_2$ is the direct bond; or $C_1$-$C_8$-alkylene, which is optionally substituted by one or more $C_1$-$C_4$alkyl or interrupted by —O—, or $NR_9R_{10}$;
$R_3$ is hydrogen; or $C_1$-$C_4$alkyl;
$R_4$ is CO—$R_6$;
$R_5$ is $C_1$-$C_4$alkyl;
$R_6$ is $C_1$-$C_4$alkyl;
$R_9$ and $R_{10}$ independently from each other are hydrogen; or $C_1$-$C_5$alkyl; and
An⁻ is an anion.

Most preferred are dyes of formula (3), wherein
$R_1$ is hydrogen; or $C_1$-$C_4$alkyl;
$R_2$ is is the direct bond; or $C_1$-$C_8$-alkylene, which is optionally substituted by one or more $C_1$-$C_4$alkyl or interrupted by —O—, or $NR_9R_{10}$;
$R_3$ is hydrogen; or $C_1$-$C_4$alkyl;
$R_4$ is CO—$CH_3$;
$R_5$ is $C_1$-$C_4$alkyl;
$R_9$ and $R_{10}$ independently from each other are hydrogen; or $C_1$-$C_5$alkyl; and
An⁻ is an anion.

Of very most interest are the dyes of formulae

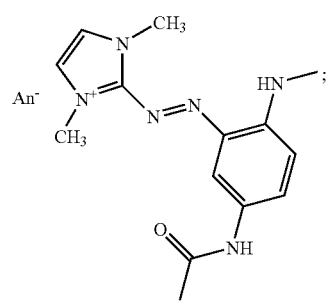
(4)

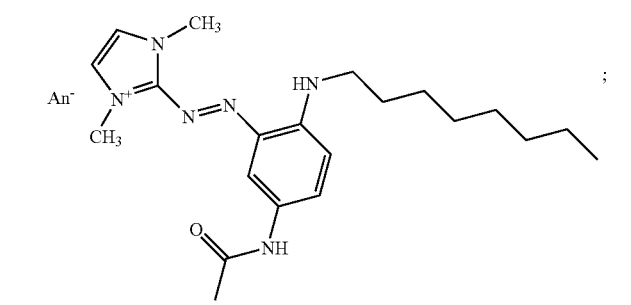
(5)

-continued
(5) 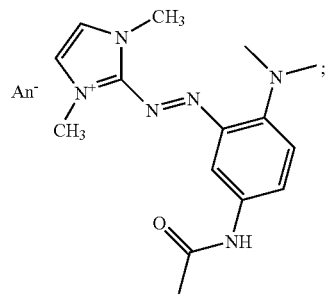
(6) 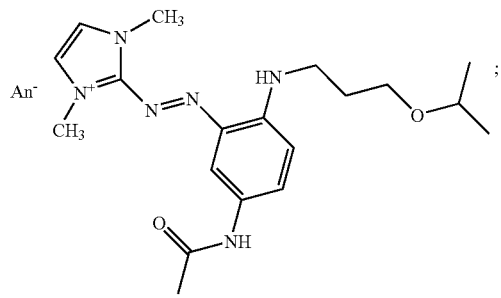
(7)
(8) 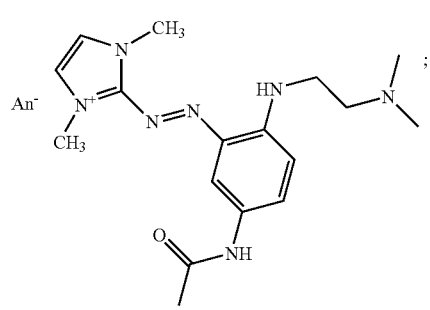
(9) 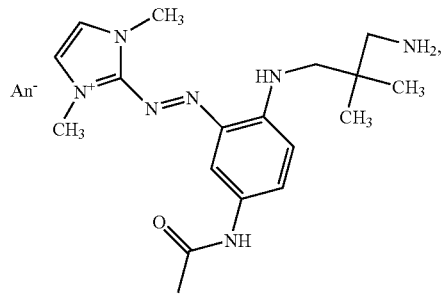
(10) 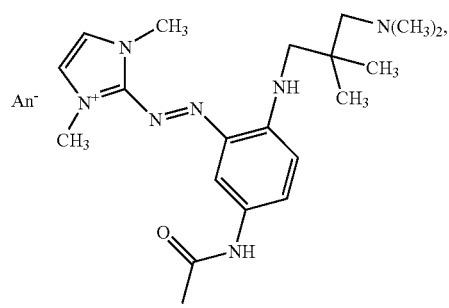
(11) 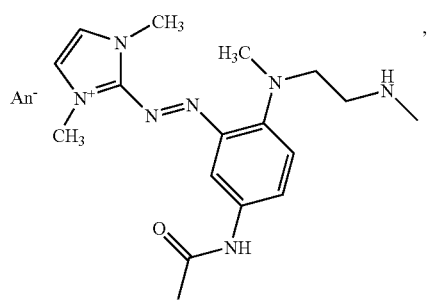
(12) 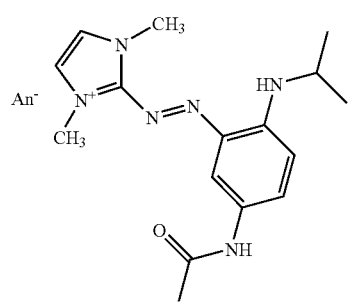
(13) 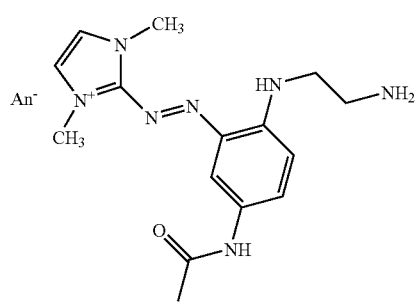
(14) 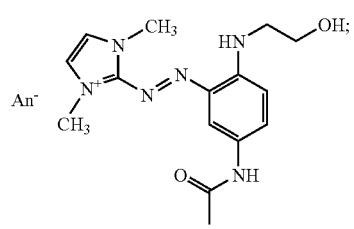
(15) 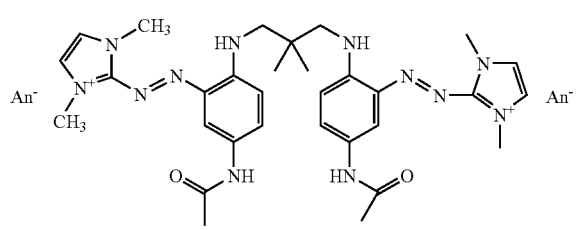

-continued

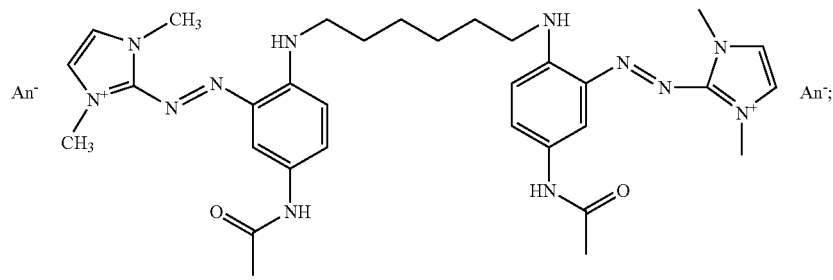

(16)

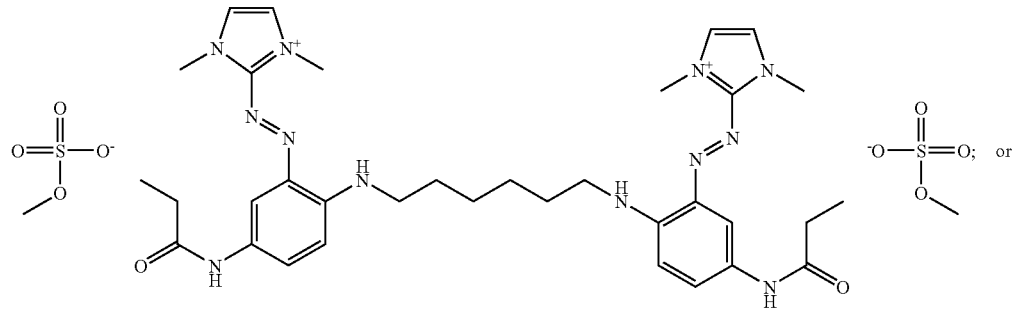

(17)

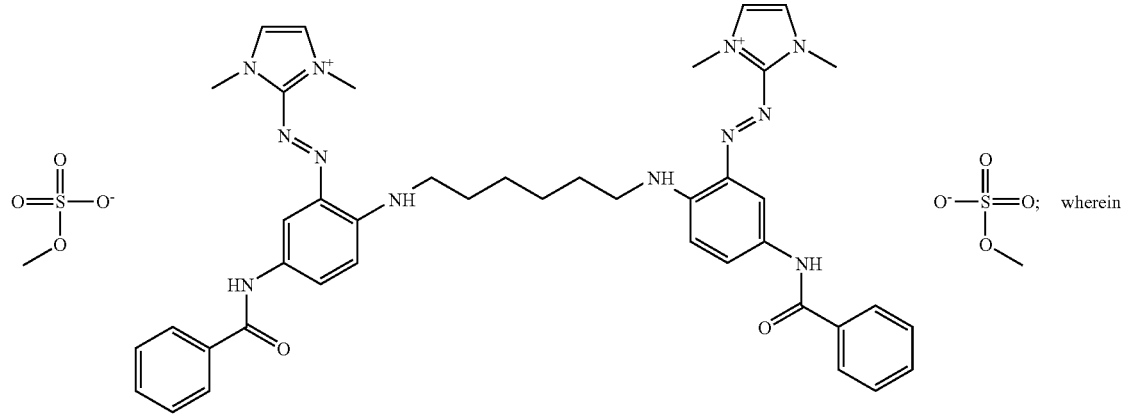

(18)

An⁻ is an anion.

The present invention relates to dyes of formula

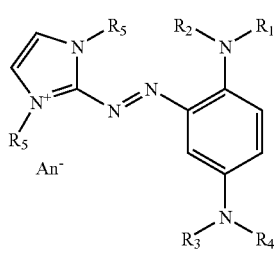

(2a)

wherein $R_1$ and $R_2$ are each independently of the other hydrogen; or unsubstituted or substituted $C_1$-$C_{14}$alkyl, allyl, aralkyl, preference is given to $C_1$-$C_8$alkyl, more preference to $C_1$-$C_4$alkyl, and most preference is given to methyl and ethyl, and especially most preference is given to methyl; or $R_1$ is hydrogen, or unsubstituted or substituted $C_1$-$C_{14}$alkyl, allyl, aralkyl, preference is given to $C_1$-$C_8$alkyl, more preference to $C_1$-$C_4$alkyl, and most preference is given to methyl and ethyl, and especially most preference is given to methyl, and $R_2$ is substituent of formula

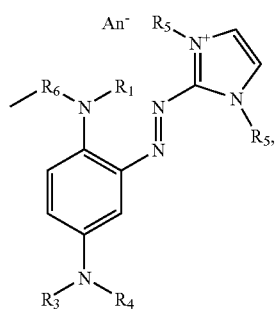

(2b)

wherein $R_6$ is unsubstituted or substituted $C_1$-$C_{14}$alkylen; and $R_3$ is hydrogen or an unsubstituted or substituted $C_1$-$C_{14}$alkyl, allyl, aralkyl or CO—$R_1$;

$R_4$ is CO—$R_9$;

$R_5$ is unsubstituted or substituted $C_1$-$C_{14}$alkyl, allyl or aralkyl;

$R_9$ is hydrogen; or unsubstituted or substituted $C_1$-$C_{14}$alkyl, allyl or aralkyl, preference is given to unsubstituted $C_1$-$C_{14}$alkyl, and more preference to methyl; and An⁻ is an anion.

The present invention relates also to a process for the preparation of the dyes of formula (1).

The process comprises reacting the compound of formula (19) with an amine of formula (20) to give the dye of formula (1) according to the following reaction scheme:

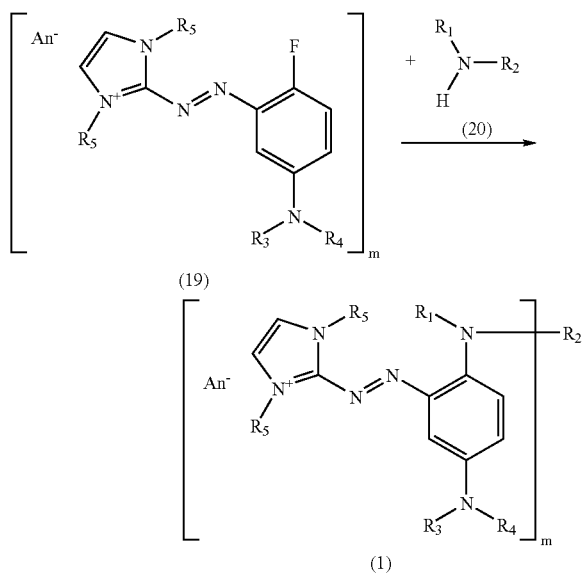

wherein $R_1$, $R_2$, $R_3$, $R_4$, $R_5$, m and An⁻ are defined as in formula (1).

The reaction is generally initiated by contacting the starting compounds of formula (19) and (20), for example by mixing together these compounds or by drop-wise addition of one compound to the other.

Customary, the temperature during the mixing period of the starting compounds is from 273 to 300K, preferably from 290 to 300K.

The molar ratio of the compound of formula (19) to the amine of formula (20) is generally from 5:1 to 1:5, preferably from 3:1 to 1:3.

The reaction time generally depends on the reactivity of the starting compounds, the selected reaction temperature and on the desired conversion and is usually from one hour to three days.

The reaction temperature is preferably from 263 to 340K, more preferably from 270 to 320K.

The reaction is generally carried out under a pressure from 70 kPa to 10 MPa, preferably from 90 kPa to 5 MPa, and more preferably under atmospheric pressure.

Preferably the reaction is carried out in the presence of a catalyst.

The molar ratio of the compound of formula (19) to the catalyst is generally from 10:1 to 1:5, preferably from 10:1 to 1:1.

Suitable catalysts are for example alkali metal $C_1$-$C_6$alkyloxides, such as sodium-, potassium or lithium $C_1$-$C_6$alkyloxides, preferably sodium methoxide, potassium methoxide or lithium methoxide, or sodium ethoxide, potassium ethoxide or lithium ethoxide; or tertiary amines, such as chinuclidine, N-methylpiperidine, pyridine, trimethylamine, triethylamine, trioctylamine, 1,4-diazabicyclo[2.2.2]octane; or alkalimetal acetate, such as sodium acetate, potassium acetate, or lithium acetate.

Preferred catalysts are potassium acetate, sodium methoxide, pyridine and 1,4-diaza-bicyclo[2.2.2]octane.

The reaction may be carried out with or without a solvent, but is preferably carried out in the presence of a solvent.

Solvents are understood as organic solvents or water, or as a mixture of different organic solvents or a mixture of different organic solvents and water.

Preference is given to organic solvents or solvent mixtures.

Organic solvents are for example, protic or aprotic polar organic solvents, such as alcohols, for example methanol, ethanol, n-propanol, isopropanol, butanol or glycols, preferably isopropanol, or nitrile, such as acetonitrile or propionitrile, or amide, such as dimethylformamide, dimethylacetamide or N-methylpyridine, N-methylpyrolidone, or sulfoxide, such as dimethylsulfoxide, or mixtures thereof.

The weight ratio of the compound of formula (19) to the solvent is generally from 20 to 90% by weight, preferably from 30 to 60% by weight.

The product prepared according to the present invention may advantageously be worked up and isolated in a usual manner, and, if desired, be purified.

Customary, the work up starts with decreasing the temperature of the reaction mixture within in a range of 280 to 300K, preferably in the range of 290 to 300K.

It may be of advantage to decrease the temperature slowly, generally over a period of several hours.

In general, the reaction product is filtered off and then washed with water or a salt solution and subsequently dried.

Filtration is normally carried out with standard filtering equipments, for example Büchner funnels, filter presses, pressurised suction filters, preferably in vacuo.

The drying temperature is dependent on the applied pressure. Drying is usually carried out in vacuo at 50-200 mbar, within a temperature range from 313 to 363K, preferably from 323 to 353K, and more preferably from 328 to 348K.

Advantageously the product is purified by recrystallisation after isolaion.

The recrystallisation is preferably carried out with organic solvents and solvent mixtures. Preference is given to alcohols, for example methanol, ethanol, 2-propanol or butanol, especially 2-propanol.

The present invention also relates to a process for the preparation of the starting compounds of formula (19), wherein $R_3$ is hydrogen; and $R_4$ is CO—$R_6$. These compounds correspond to formula (21).

The process comprises (a) acylating a 4-fluoro-3-nitroaniline of formula (21a) with an acylating agent of formula (22)

(b) reducing the nitro group in formula (21b) to the amino group to give the compound of formula (21c), (c) diazotizing the compound of formula (21c) to give the compound of formula (197d), (d) coupling the diazotized compound of formula (21d) with imidazole to give the compound of formula (19e), and (e) alkylating the compound of formula (21e) with an alkylating agent $R_5$—$X_2$ to give the compound of formula (21), according to the following reaction scheme:

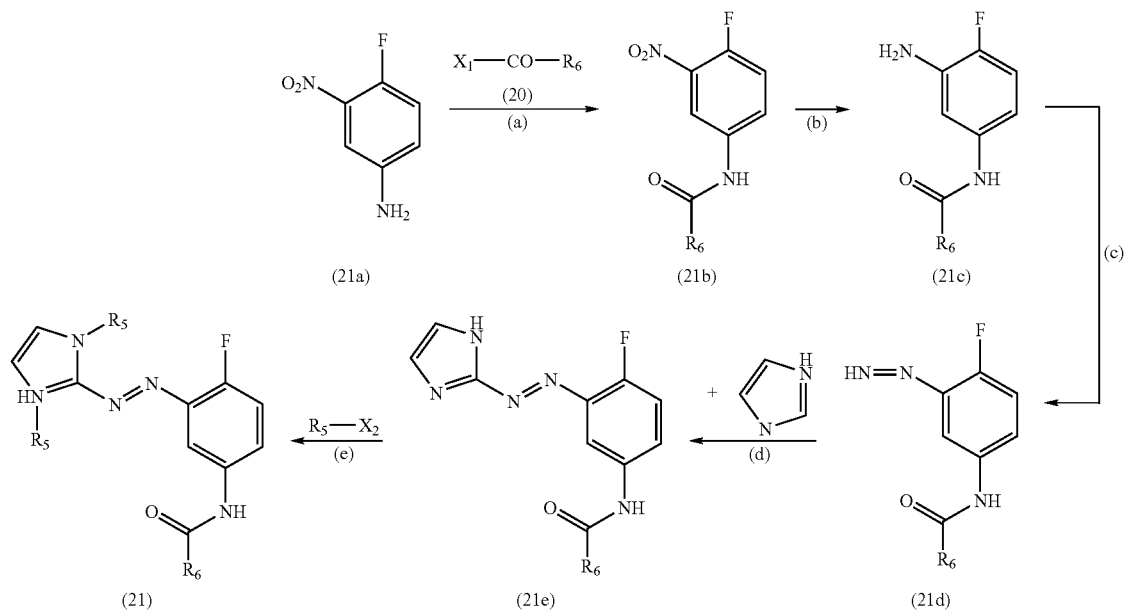

wherein $R_1$, $R_2$ $R_3$, $R_4$, $R_5$ and $R_6$ are defined as in formula(1); and $X_1$ and $X_2$ are halogen.

The acylation, reduction, diazotation, coupling and alkylation can be carried out with methods known per se.

The dyes of formula (1) according to the invention are suitable for dyeing organic materials, such as keratin-containing fibers, wool, leather, silk, cellulose or polyamides, cotton or nylon, and preferably human hair. The dyeings obtained are distinguished by their depth of shade and their good fastness properties to washing, such as, for example, fastness to light, shampooing and rubbing.

The multiplicity of shades of the dyes can be increased by combination with other dyes.

Therefore the dyes of formula (1) of the present invention may be combined with dyes of the same or other classes of dyes, especially with direct dyes, oxidation dyes; dye precursor combinations of a coupler compound as well as a diazotized compound, or a capped diazotized compound; and/or cationic reactive dyes.

Direct dyes are of natural origin or may be prepared synthetically. They are uncharged, cationic or anionic, such as acid dyes.

The dyes of formula (1) may be used in combination with at least one single direct dye different from the dyes of formula (1).

Direct dyes do not require any addition of an oxidizing agent to develop their dyeing effect. Accordingly the dyeing results are less permanent than those obtained with permanent dyeing compositions. Direct dyes are therefore preferably used for semipermanent hair dyeings.

Examples of direct dyes are described in "Dermatology", edited by Ch. Culnan, H. Maibach, Verlag Marcel Dekker Inc., New York, Basle, 1986, Vol. 7, Ch. Zviak, The Science of Hair Care, chapter 7, p. 248-250, and in "Europäisches Inventar der Kosmetikrohstoffe", 1996, published by The European Commission, obtainable in diskette form from the Bundesverband der deutschen Industrie—und Handelsunternehmen für Arzneimittel, Reformwaren und Körperpflegemittel e.V., Mannheim.

Furthermore, the dyes of formula (1) may be combined with at least one cationic azo dye, for example the compounds disclosed in GB-A-2 319 776 as well as the oxazine dyes described in DE-A-299 12 327 and mixtures thereof with the other direct dyes mentioned therein.

Furthermore, cationic nitroaniline and anthraquinone dyes are useful for a combination with a dye of formula (1).

The dyes of formula (1) may also be combined with acid dyes, for example the dyes which are known from the international names (Color index), or trade names.

The dyes of formula (1) may also be combined with uncharged dyes, for example selected from the group of the nitroanilines, nitrophenylenediamines, nitroaminophenols, anthraquinones, indophenols, phenazines, phenothiazines, bispyrazolons, bispyrazol aza derivatives and methines.

Furthermore, the dyes of formula (1) may also be used in combination with oxidation dye systems.

Oxidation dyes, which, in the initial state, are not dyes but dye precursors are classified according to their chemical properties into developer and coupler compounds.

Suitable oxidation dyes are described for example in

DE 19 959 479, especially in col 2, l. 6 to col 3, l. 11;

"Dermatology", edited by Ch. Culnan, H. Maibach, Verlag Marcel Dekker Inc., New York, Basle, 1986, Vol. 7, Ch. Zviak, The Science of Hair Care, chapter 8, on p. 264-267 (oxidation dyes);

Furthermore, autooxidizable compounds may be used in combination with the dyes of formula (1).

Autooxidizable compounds are aromatic compounds with more than two substituents in the somatic ring, which have a very low redox potential and will therefore be oxidized when exposed to the air. The dyeings obtained with these compounds are very stable and resistant to schampoo.

Autooxidizable compounds are for example benzene, indol, or indol, especially 5,6-dihydroxyindol or 5,6-dihydroxyindol. derivatives as described in WO 99/20234, especially on p. 26, I. 10 to p. 28, I. 15, or in WO 00/28957 on p. 2, third paragraph.

The dyes of formula (1) may also be used in combination with naturally occurring dyes, such as henna red, henna neutral, henna black, camomile blossom, sandalwood, black tea, *Rhamnus frangula* bark, sage, campeche wood, madder root, catechu, sedre and alkanet root. Such dyeings are described, for example, in EP-A-404 868, especially on p. 3, I. 55 to p. 4, I. 9.

Furthermore, the dyes of formula (1) may also be used in combination with capped diazotised compounds.

Suitable diazotised compounds are for example the compounds of formulae (1)-(4) in WO 2004/019897 (bridging gages 1 and 2) and the corresponding watersoluble coupling components (I)-(IV) as disclosed in the same reference on p. 3 to 5.

Further preferred dyes or dye combinations which are useful for the combination with a dye of formula (1) according to the present invention are described in (DC-01): WO 95/01772, wherein mixtures of at least two cationic dyes are disclosed, especially p. 2, I. 7 to p. 4, I. 1, preferably p. 4, I. 35 to p. 8, I. 21; formulations p. 11, last §-p. 28, I. 19;

(DC-02): U.S. Pat. No. 6,843,256, wherein cationic dyes are disclosed, especially the compounds of formulae (1), (2), (3) and (4) (col. 1, I. 27- col. 3, I. 20, and preferably the compounds as prepared in the examples 1 to 4 (col. 10, I. 42 to col. 13, I. 37; formulations col. 13, I. 38 to col. 15, I. 8;

(DC-03): EP 970 685, wherein direct dyes are described, especially p. 2, I. 44 to p. 9, I. 56 and preferably p. 9, I. 58 to p. 48, I. 12; processes for dyeing of keratin-containing fibers especially p. 50, I. 15 to 43; formulations p. 50, I. 46 to p. 51, I. 40;

(DC-04): DE-A-19 713 698, wherein direct dyes are described, especially p. 2, I. 61 to p. 3, I. 43; formulations p. 5, I. 26 to 60;

(DC-05): U.S. Pat. No. 6,368,360, wherein directd dyes (col. 4, I. 1 to col. 6, I. 31) and oxidizing agents (col. 6, I. 37-39) are disclosed; formulations col. 7, I. 47 to col. 9, I. 4;

(DC-06): EP 1 166 752, wherein cationic dyes (p. 3, I. 22- p. 4, I. 15) and anionic UV-absorbers (p. 4, I. 27-30) are disclosed; formulations p. 7, I. 50- p. 9, I. 56;

(DC-07): EP 998,908, wherein oxidation dyeings comprising a cationic direct dye and pyrazolo-[1,5-a]-pyrimidines (p. 2, I. 48- p. 4, I. 1) are disclosed; dyeing formulations p. 47, I. 25to p. 50, I. 29;

(DC-08): FR-2788432, wherein combinations of cationic dyes with Arianors are disclosed, especially p. 53, I. 1 to p. 63, I. 23, more especially p. 51 to 52, most especially Basic Brown 17, Basic brown 16, Basic Red 76 and Basic Red 118, and/or at least one Basic Yellow 57, and/or at least one Basic Blue 99; or combinations of arianoren and/or oxidative dyes, especially p. 2, I. 16 to p. 3, I. 16; dyeing formulations on p. 53, I. 1 to p. 63, I. 23;

(DC-09): DE-A-19 713 698, wherein the combinations of direct dyes and permanent-wave fixing comprising an oxidation agent, an oxidation dye and a direct dye are disclosed; especially p. 4, I. 65 to p. 5, I. 59;

(DC-10): EP 850 638, wherein developer compounds and oxidizing agents are disclosed; especially p. 2, I. 27 to p. 7, I. 46 and preferably p. 7, I. 20 to p. 9, I. 26; dyeing formulations p. 2, I. 3-12 and I. 30 to p. 14, and p. 28, I. 35-p. 30, I. 20; preferably p. 30, I. 25-p. 32, I. 30;

(DC-11): U.S. Pat. No. 6,190,421 wherein extemporaneous mixtures of a composition (A) containing one or more oxidation dye precursors and optionally one or more couplers, of a composition (B), in powder form, containing one or more direct dyes (col. 5, I. 40-col. 7, I. 14), optionally dispersed in an organic pulverulent excipient and/or a mineral pulverulent excipient, and a composition (C) containing one or more oxidizing agents are disclosed; formulations col. 8, I. 60-col. 9, I. 56;

(DC-12): U.S. Pat. No. 6,228,129, wherein a ready-to-use composition comprising at least one oxidation base, at least one cationic direct dye and at least one enzyme of the 2-electron oxidoreductase type in the presence of at least one donor for the said enzyme are disclosed; especially col. 8, I. 17-col. 13, I. 65; dyeing formulations in col. 2, I. 16 to col. 25, I. 55, a multi-compartment dyeing device is described in col. 26, I. 13-24;

(DC-13): WO 99/20235, wherein compositions of at least one cationic dye and at least one nitrated benzene dye with cationic direct dyes and nitro benzene direct dyes are described; on p. 2, I. 1 to p. 7, I. 9, and p. 39, I. 1 to p. 40 1.11, preferably p. 8, I. 12 to p. 25 I.6, p. 26, I. 7 to p. 30, I. 15; p. 1, I. 25 to p. 8, I. 5, p. 30, I. 17 to p. 34 I. 25, p. 8, I. 12 to p. 25 I. 6, p. 35, I. 21 to 27, especially on p. 36, I. 1 to p. 37;

(DC-14): WO 99/20234, wherein compositions comprising at least one direct cationic dye and at least one autooxidisable dye, especially benzene, indol and indol. derivatives are described, preferably direct dyes on p. 2, I. 19 to p. 26, I. 4, and autooxidisable dyes as dislosed especially on p. 26, I. 10 to p. 28, I. 15; dyeing formulations especially on p. 34, I. 5 to p. 35, Ii 18;

(DC-15): EP 850 636, wherein oxidation dyeing compositions comprising at least one direct dye and at least one meta-aminophenol derivative as coupler component and at least one developer compound and an oxidizing agent are disclosed, especially p. 5, I. 41 to p. 7, I. 52, dyeing formulations p. 19, I. 50-p. 22, I. 12;

(DC-16): EP-A-850 637, wherein oxidation dyeing compositions comprising at least one oxidation base selected from para-phenylenediamines and bis(phenyl)alkylenediamines, and the acid-addition salts thereof, at least one coupler selected from meta-diphenols, and the acid-addition salts thereof, at least one cationic direct dye, and at least one oxidizing agent are disclosed, especially p. 6, I. 50 to p. 8, I. 44 are discloseded; dyeing formulations p. 21, I. 30-p. 22, I. 57;

(DC-17): WO 99/48856, wherein oxidation dyeing compositions comprising cationic couplers are disclosed, especially p. 9, I. 16-p. 13, I. 8, and p. 11, I. 20-p. 12, I. 13; dyeing formulations p. 36, I. 7-p. 39, I. 24;

(DC-18): DE 197 172 24, wherein dyeing agents comprising unsaturated aldehydes and coupler compounds and primary and secondary amino group compounds, nitrogen-containing heterocyclic compounds, amino acids, oligopeptids, aromatic hydroxy compounds, and/or at least one CH-active compound are disclosed p. 3, I. 42-p. 5 I. 25; dyeing formulations p. 8, I. 25-p. 9, I. 61.

In the dye combinations disclosed in the references (DC-01-DC-18) above, the dyes of formula (1) according to the present invention may be added to the dye combinations or dyeing formulations or one or more of the dye components may be replaced with at least one dye of formula (1).

The present invention also releates to formulations, which are used for the dyeing of organic materials, preferably keratin-containing fibers, and most preferably human hair, comprising at least one dye of formula (1).

Preferably the dyes of formula (1) are incorporated into the composition for treating organic material, preferably for dyeing in amounts of 0.001-5% by weight (hereinafter indicated merely by "%"), particularly 0.005-4%, more particularly 0.2-3%, based on the total weight of the composition.

The formulations may be applied on the keratin-containing fiber, preferably the human hair in different technical forms.

Customary the dyeing compositions are applied to the keratin-containing fiber in an amount of 50 to 100 g.

Preferred forms of formulations are ready-to-use compositions or multi-compartment dyeing devices or 'kits' or any of the multi-compartment packaging systems with compartments as described for example in U.S. Pat. No. 6,190,421, col 2, I. 16 to 31.

The pH value of the ready-to-use dyeing compositions is usually from 2 to 11, preferably from 5 to 10.

One preferred embodiment of the present invention relates to the formulation of dyes, wherein the dyes of formula (1) are in powder form.

Powder formulations are preferably used if stability and/or solubility problems as for example described in DE 197 13698, p. 2, I. 26 to 54 and p. 3, I. 51 to p. 4, I. 25, and p. 4, I. 41 to p. 5 I. 59.

Suitable cosmetic hair-care formulations are hair-treatment preparations, e.g. hair-washing preparations in the form of shampoos and conditioners, hair-care preparations, e.g. pre-treatment preparations or leave-on products such as sprays, creams, gels, lotions, mousses and oils, hair tonics, styling creams, styling gels, pomades, hair rinses, treatment packs, intensive hair treatments, hair-structuring preparations, e.g. hair-waving preparations for permanent waves (hot wave, mild wave, cold wave), hair-straightening preparations, liquid hair-setting preparations, hair foams, hairsprays, bleaching preparations, e.g. hydrogen peroxide solutions, lightening shampoos, bleaching creams, bleaching powders, bleaching pastes or oils, temporary, semi-permanent or permanent hair colorants, preparations containing self-oxidizing dyes, or natural hair colorants, such as henna or camomile.

For use on human hair, the dyeing compositions of the present invention can usually be incorporated into an aqueous cosmetic carrier. Suitable aqueous cosmetic carriers include, for example W/O, O/W, O/W/O, W/O/W or PIT emulsions and all kinds of microemulsions, creams, sprays, emulsions, gels, powders and also surfactant-containing foaming solutions, e.g. shampoos or other preparations, that are suitable for use on keratin-containing fibers. Such forms of use are described in detail in Research Disclosure 42448 (August 1999). If necessary, it is also possible to incorporate the dyeing compositions into anhydrous carriers, as described, for example, in U.S. Pat. No. 3,369,970, especially col 1, I. 70 to col 3, I. 55. The dyeing compositions according to the invention are also excellently suitable for the dyeing method described in DE-A-3 829 870 using a dyeing comb or a dyeing brush.

The constituents of the aqueous carrier are present in the dyeing compositions of the present invention in the customary amounts; for example emulsifiers may be present in the dyeing compositions in concentrations from 0.5 to 30% by weight and thickeners in concentrations from 0.1 to 25% by weight of the total dyeing composition.

The dyes of formula (1) may be stored in a liquid to paste-like preparation (aqueous or non-aqueous) or in the form of a dry powder.

When the dyes are stored separately, the reactive components are intimately mixed with one another directly before use. In the case of dry storage, a defined amount of hot (from 50 to 80° C.) water is usually added and a homogeneous mixture prepared before use.

The dyeing compositions according to the invention may comprise any active ingredients, additives or adjuvants known for such preparations, for example non-ionic polymers, cationic polymers, acrylamide/dimethyidiallylammonium chloride copolymers, diethyl-sulfate-quarternised dimethylaminoethyl methacrylate/vinylpyrrolidone copolymers, vinylpyrrolidone/imidazolinium methochloride copolymers; quaternised polyvinyl alcohol, zwitterionic and amphoteric polymers, anionic polymers, thickeners, structuring agents, hair-conditioning compounds, protein hydrolysates, perfume oils, solubilisers, anti-dandruff active ingredients, substances for adjusting the pH value, panthenol, pantothenic acid, allantoin, pyrrolidonecarboxylic acids and salts thereof, plant extracts and vitamins, cholesterol; light stabilisers and UV absorbers, consistency regulators, fats and waxes, fatty alkanolamides; polyethylene glycols and polypropylene glycols having a molecular weight of from 150 to 50 000, complexing agents, swelling and penetration substances, opacifiers, pearlising agents, propellants, antioxidants; sugar-containing polymers, quaternary ammonium salts and bacteria inhibiting agents.

The dyeing compositions according to the present invention generally comprise at least one surfactant. Suitable surfactants are zwitterionic or ampholytic, or more preferably anionic, non-ionic and/or cationic surfactants.

Suitable anionic surfactants are characterised by an anionic group that imparts water solubility, for example a carboxylate, sulfate, sulfonate or phosphate group, and a lipophilic alkyl group having approximately 10 to 22 carbon atoms. In addition, glycol or polyglycol ether groups, ester, ether and amide groups and also hydroxy groups may be present in the molecule.

Preferred anionic surfactants are alkyl sulfates, alkyl polyglycol ether sulfates and ether carboxylic acids having 10 to 18 carbon atoms in the alkyl group and up to 12 glycol ether groups in the molecule, and also especially salts of saturated and especially unsaturated $C_8$-$C_{22}$carboxylic acids, such as oleic acid, stearic acid, isostearic acid and palmitic acid.

Surface-active compounds that carry at least one quaternary ammonium group and at least one —COO⁻ or —SO₃⁻ group in the molecule are terminated zwitterionic surfactants. Preference is given the so-called betaines, such as the N-alkylN,N-dimethylammonium glycinates, for example cocoalkyldimethylammonium glycinate, N-acylaminopropyl-N,N-dimethylammonium glycinates, for example cocoacylaminopropyidimethylammonium glycinate, and 2-alkyl-3-carboxymethyl-3-hydroxyethylimidazol. having from 8 to 18 carbon atoms in the alkyl or acyl group and also cocoacylaminoethylhydroxyethylcarboxymethyl glycinate. A preferred zwitterionic surfactant is the fatty acid amide derivative known by the CTFA name cocoamidopropyl betaine.

Ampholytic surfactants are surface-active compounds that, in addition to a $C_8$-$C_{18}$-alkyl or -acyl group and contain at least one free amino group and at least one —COOH or —SO₃H group in the molecule and are capable of forming internal salts. Examples of suitable ampholytic surfactants include N-alkylglycines, N-alkylpropionic acids, N-alkylaminobutyric acids, N-alkyliminodipropionic acids, N-hydroxyethyl-N-alkylamidopropylglycines, N-alkyltaurines, N-alkylsarcosines, 2-alkylaminopropionic acids and alkylaminoacetic acids, each having approximately from 8 to 18 carbon atoms in the alkyl group. Ampholytic surfactants to which special preference is given are N-cocoalkylaminopropionate, cocoacylaminoethylaminopropionate and $C_{12}$-$C_{18}$acylsarcosine.

Suitable non-ionic surfactants are described in WO 00/10519, especially p. 45, I. 11 to p. 50, I. 12. Non-ionic surfactants contain as hydrophilic group, for example, a polyol group, a polyalkylene glycol ether group or a combination of polyol and polyglycol ether groups. Examples of cationic surfactants that can be used in the dyeing compositions according to the invention are especially quaternary ammonium compounds.

Alkylamidoamines, especially fatty acid amidoamines, such as the stearylamidopropyl-dimethylamine obtainable under the name Tego Amid® 18 are also preferred as surfactants in the present dyeing compositions. They are distinguished not only by a good conditioning action but also especially by their good biodegradability.

A further embodiment of the present invention relates to the dyeing of keratin-containing fibers.

The processes comprises
(a) treating the keratin-containing fiber with at least one dye of formula (1), and
(b) leaving the fiber to stand and then rinsing the fiber.

The dyes of formula (1) are suitable for all-over dyeing of the hair, that is to say when dyeing the hair on a first occasion, and also for re-dyeing subsequently, or dyeing of locks or parts of the hair.

The dyes of formula (1) are applied on the hair for example by massage with the hand, a comb, a brush, or a bottle, or a bottle, which is combined with a comb or a nozzle.

In the processes for dyeing according to the invention, whether or not dyeing is to be carried out in the presence of a further dye will depend upon the color shade to be obtained.

Further preferred is a process for dyeing keratin-containing fibers which comprises treating the keratin-containing fiber with at least one dye of formula (1), a base and an oxidizing agent.

A preferred embodiment for dyeing keratin-containing fibers, in particular human hair, with a dye of formula (1) and an oxidizing agent, comprises
$a_1$) treating the keratin-containing fiber with the oxidizing agent, which optionally contains at least one dye of formula (1),
$b_1$) treating the keratin-containing fibe with an oxidizing agent free composition, which optionally contains at least one dye of formula (1); or alterntively
$a_2$) treating the keratin-containing fiber with an oxidizing agent free composition, which optionally contains at least one dye of formula (1);
$b_2$) treating the keratin-containing fiber with an oxidizing agent, which optionally contains least one dye of formula (1), with the proviso that at least in one of the process steps $a_1$), $a_2$), $b_1$) or $b_2$) a dye of formula (1) is present.

In general, the oxidizing agent containing composition is left on the fiber for 0 to 15 minutes, in particular for 0 to 5 minutes at 15 to 45° C.

The oxidizing agent free composition usually comprises customary adjuvants and additives. Preferred are those, which are described in German Patent Application, in col 3, I. 17 to I. 41.

In general, the dye of formula (1) and the oxidizing agent free composition are left on the fiber for 5 to 45 minutes, in particular for 10 to 25 minutes at 15 to 50° C.

Oxidizing agents are for example persulfate or dilute hydrogen peroxide solutions, hydrogen peroxide emulsions or hydrogen peroxide gels, alkal, earth metal peroxides, organic peroxides, such as urea peroxides, melamine peroxides, or alkalimetalbromat fixations are also applicable if a shading powder on the basis of semi-permanent, direct hair dyes is used.

Most preferred oxidizing agent is hydrogen peroxide, preferably used in a concentration from about 2 to 30%, more preferably about 3 to 20% by, and most preferably from 6 to 12% by weight the corresponding composition.

The oxidizing agents may be present in the dyeing compositions according to the invention preferably in an amount from 0.01% to 6%, especially from 0.01% to 1%, based on the total dyeing composition.

In general, the dyeing with an oxidative agent is carried out in the presence of a base, for example ammonia, alkali metal carbonates, earth metal (potassium or lithium) carbonates, alkanol amines, such as mono-, di- or triethanolamine, alkali metal (sodium) hydroxides, earth metal hydroxides or compounds of the formula

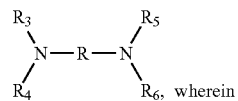

wherein

R is a propylene residue, which may be substituted with OH or $C_1$-$C_4$alkyl, $R_3$, $R_4$, $R_5$ and $R_6$ are independently or dependently from each other hydrogen, $C_1$-$C_4$alkyl or hydroxy-($C_1$-$C_4$)alkyl.

The pH-value of the oxidizing agent containing composition is usually about 2 to 7, and in particular about 2 to 5.

One preferred method of applying formulations-comprising the dyes of formula (1) on the keratin-containing fiber, preferably the hair is by using a multi-compartment dyeing device or "kit" or any other multi-compartment packaging system, as described for example in WO 97/20545 on p. 4, I. 19 to I. 27.

The first compartment contains for example at least one dye of formula (1) and optionally further direct dyes and a basifying agent, and in the second compartment an oxidizing agent; or in the first compartment at least one dye of formula (1) and optionally further direct dyes, in the second compartment a bsifiying agent and in the third compartment an oxidizing agent.

A further preferred embodiment of the present invention relates to a method of dyeing hair with oxidative dyes, which comprises
a. mixing at least one dye of formula (1) and optionally at least one coupler compound and at least one developer compound, and an oxidizing agent, which optionally contains at least one further dye, and
b. contacting the keratin-containing fibers with the mixture as prepared in step a.

Furthermore, the present invention relates to a process of dyeing of keratin-containing fibers of the dyes of formula (1) with autooxidable compounds and optionally further dyes.

Furthermore, the present invention relates to a process for dyeing keratin-containing fibers with the dyes of formula (1) and capped diazotised compounds.

Furthermore, the present invention relates to a process for dyeing keratin-containing fibers with the dyes of formula (1) and at least one acid dye.

The following examples serve to illustrate the processes for dyeing without limiting the processes thereto. Unless specified otherwise, parts and percentages relate to weight. The amounts of dye specified are relative to the material being dyed.

EXAMPLES

A. Preparation of New Compounds

Example A1

Preparation of the Compound of Formula (101a)

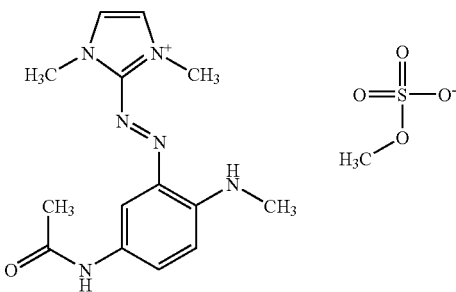

a. 100 g 4-fluoro-3-nitro-anilin are added to a stirred mass of 80 g methanol, 0.1 ml sulfuric acid, 90 ml of acetic anhydride during 15 minutes at 333K.

Heating and boiling are continued for 15 minutes.

The reaction mixture is cooled down slowly to 273K under stirring.

At the final temperature stirring is continued for 30 minutes, then the suspension is filtered, washed with cold methanol and dryed in the vacuum dryer.

114 g of the acetyl derivative are obtained which is worked up further.

b. 130 g iron and 35 ml concentrated hydrochloric acid are added to 220 ml of water and heated to 363K. After 10 minutes a hot solution of 114 g of the acetyl derivative prepared in a. in 520 ml ethanol is continuously dosed in to the above prepared mixture of water, iron and chlorhidric acid during 1 hour. Then the reaction mass is boiled under stiring.

The hot mass is separated by filtration and the residue washed with 100 ml ethanol.

The filtrate and wash solution are mixed and cooled to 380K while the cristallization of the product takes place.

The product is separated by filtration, washed with cold ethanol and dryed in a vacuum dryer.

The dryed product is suspended in 132 ml water and 110 ml of 32% hydrochloric acid at 295K. Then the reaction mixture is cooled to 273K and 86.4 g 36% sodium nitrite solution are dropped in a rate that the temperature of the mixture is maintained in the range of 273 to 276K with cooling.

After the addition of the sodium nitrite solution the mixture is stirred for one hour.

If no excess of nitrite is detected during one hour (detection by using a potassium iodide/starch paper), further amounts of sodium nitrite solution are added.

After one hour the remaining excess of nitrite is destroyed with sulfamic acid.

Then the obtained diazo solution is dropped to a 273K cold solution of 33.4 g imidazole in 130 ml water, whereby the pH of the solution is maintained in the range of pH 9-10 by adding 36% sodium hydroxide solution.

After completing the diazo addition, the obtained suspension is warmed up to 295K, the pH is adjusted to 10.5 with 36% sodium hydroxide solution. After stirring for one hour at this pH and temperature the suspension is filtered off and then washed twice with 100 ml water to obtain 200 g of the humid product.

200 g of this product are added to a reaction vessel containing 230 ml water and subsequently suspended by stirring.

Then dimethylsulfate and sodium hydroxide are added simultaneously in a rate that the pH maintains in the range of 10-10.3 and the temperature at 300K.

After about 5 hours 3 equivalents of dimethylsulfate are introduced.

Stiring at 300K is continued for one more hour to finish the hydrolysis of excess of dimethylsulfate.

The suspension is then separated by filtration.

About 240 g of a humid solid, which gives 140 g dried product of formula

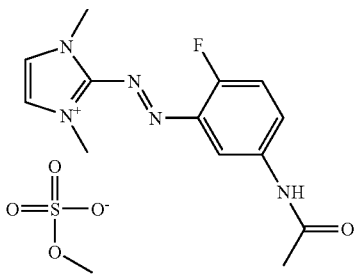

(101b)

is obtained.

The product is characterized by 1H—NMR Data in deuterated methanol (128 scans)/360 MHz

|  | Splitting | Peak Integration | Type of Compound |
|---|---|---|---|
| 8.415 | D, j = 2.7; 6.6 | 0.95 | orto |
| 7.889 | s | 2.00 | Imidazole |
| 7.820 | d, d, d; | 0.98 | para |
| 7.468 | D, d j = 9.5:9.5 | 1.04 | meta |
| 4.203 | s | 6.22 | methyl |
| 3.69 | s | 3.00 | methylsulfate |
| 2.175 | s | 3.22 | acetyl |

18.8 g of the compound of formula (101b) are added under nitrogen atmosphere at 293K to a stirred mixture of 10.6 ml of a 40% methylamine solution in 70 g acetonitrile. The temperature is maintained at 293K. The reaction mixture is stirred for 20 hours.

The reaction mass is filtered off and the filter residue washed with 45 ml of acetonitrile and dried in vacuum to obtain 12.6 g of the product of formula (101a).

The product is characterized by $^1$H-NMR Data in deuterated methanol (128 scans)/360 MHz

| 8.11 | d, j = 1.7 | 1.00 | orto |
| 7.6 overlayed | d, d, J = 8.6; j = 1.4 | 3.06 | para |
| 7.57 | s |  | Imidazole |
| 7.00 | d, j = 9.5 | 1.04 | meta |
| 4.03 | s | 6.22 | methyl |
| 3.69 | s | 3.44 | methylsulfate |
| 3.146 | s | 3.28 | Me from amine |
| 2.14 | s | 3.22 | acetyl |

Example A2

Preparation of the Compound of Formula (102)

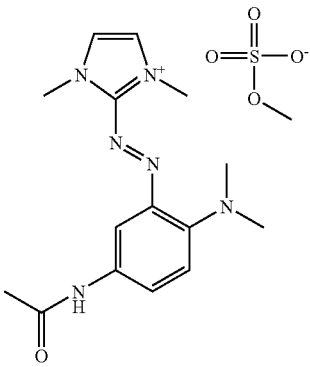

18.8 g of the compound of formula (101b) are added under nitrogen atmosphere at 293K to a stirred mixture of 15.8 ml of a 40% dimethylamine solution and 70 ml acetonitrile. At a temperature of 293K the reaction mixture is stirred for 4 hours. The reaction mass is filtered off and the filter residue is washed with 45 ml acetonitrile and dried in vacuum to obtain 14.6 g of the product of formula (102).

The product is characterized by $^1$H-NMR Data in deuterated methanol (128 scans)/360 MHz

| | | | |
|---|---|---|---|
| 8.125 | D, j = 2.7 | 1.00 | orto |
| 7.6 overlaid | d, d, j = 2.7, 9.6 | 3.17 | para |
| 7.59 | s | | Imidazole |
| 7.075 | D j = 9.5 | 1.035 | meta |
| 4.065 | s | 6.28 | methyl |
| 3.69 | s | 3.74 | methylsulfate |
| 3.61 | S | 6.4 | |
| 3.146 | s | 3.28 | methyl from amine |
| 2.14 | s | 3.22 | acetyl |
| 2.00 | m | 2.44 | |
| 1.11 | | 8.00 | Me of isopropyl |

Example A3

Preparation of the Compound of Formula (103)

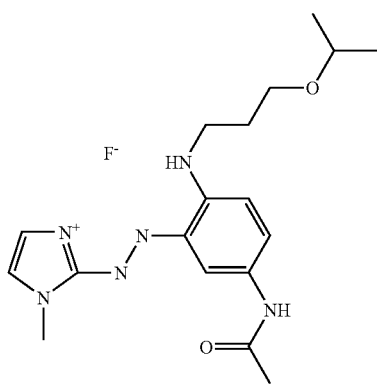

18.8 g of the compound of formula (101b) are added under nitrogen atmosphere at 293K to a stirred mixture of 10 g triethylamine, 8 g 3-isopropoxy-1-propylamine and 100 g acetonitrile. The reaction mixture is stirred for 20 hours at room temperature under atmosheric pressure. The reaction mass is filtered off and the filter cake washed with 45 ml acetonitrile and dried in vacuum to obtain 20.5 g of compound of formula (103).

The product is characterized by $^1$H-NMR Data in deuterated methanol (128 scans)/360 MHz

| | | | |
|---|---|---|---|
| 8.13 | D, j = 2.7 | 0.984 | orto |
| 7.6 overlaid | d, d | 3.12 | para |
| 7.58 | s | | imidazole |
| 7.027 | D j = 9.5 | 1.05 | meta |
| 4.089 | s | 6.4 | methyl |
| 3.69 | S, overlaid | 4.38 | methylsulfate |
| 3.60 | T; j = 6 | 2.22 | methylene |
| 2.89 | T; j = 6 | 2.23 | methylene |
| 2.285 | s | 6. | methyl |
| 2.14 | s | 3.24 | acetyl |

Example A4

Preparation of the Compound of Formula (104)

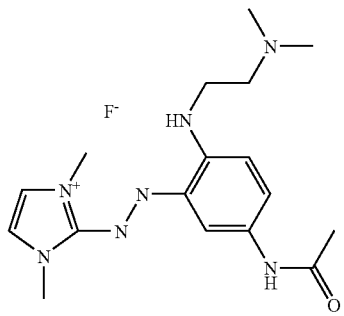

6.6 g of the compound of formula (101b) are added under nitrogen atmosphere at 293K to a stirred mixture of 1,8 g N,N-dimethylamino-ethylamine and 40 g acetonitrile. The temperature is raised to 333K. The reaction mixture is stirred for 3 hours at this temperature under atmospheric pressure. Then, the reaction mass is stirred for 4 hours, while the temperature is decreased to 295K.

The reaction mass is filtered off and the filter residue washed with 15 ml of acetonitrile and dried in vacuum to obtain 9.0 g of the product of formula (104).

The product is characterized by 1H—NMR Data in deuterated methanol (128 scans)/360 MHz

| | | | |
|---|---|---|---|
| 8.13 | D, j = 2.7 | 0.984 | orto |
| 7.6 overlaid | d, d | 3.12 | para |
| 7.58 | s | | Imidazole |
| 7.027 | D j = 9.5 | 1.05 | meta |
| 4.089 | s | 6.4 | methyl |
| 3.69 | S, overlaid | 4.38 | methylsulfate |
| 3.60 | T; j = 6 | 2.22 | methylene |
| 2.89 | T; j = 6 | 2.23 | methylene |
| 2.285 | s | 6. | methyl |
| 2.14 | s | 3.24 | acetyl |

Example A5

Preparation of the Compound of Formula (105)

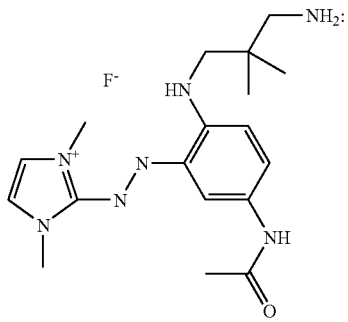

11.3 g of the compound of formula (101b) are added under nitrogen atmosphere at 293K to a stirred mixture of 3.06 g 2,2-dimethyl-1,3-diaminopropane and 40 g water. The temperature is raised to 333K. The reaction mixture is stirred for 6 hours at this temperature under nitrogen and atmospheric pressure. The reaction mass is stirred for 4 hours, while the temperature is decreased to 295K. The reaction mass is filtered off and the filter residue washed with 30 ml of a water/sodium chloride solution and dried in vacuum to obtain 12 g of product of formula (105).

The product is characterized by $^1$H-NMR Data in deuterated methanol (128 scans)/360 MHz

| 8.18 | d | 1.4 | 1.00 | orto |
|---|---|---|---|---|
| 7.583 | s | | 2.99 | imidazole |
| 7.579 | m | | | para |
| 7.203 | d | 7.5 | 1.02 | meta |
| 4.067 | s | | 6.05 | Dimethyl at the imidazol |
| 3.350 | s | | 2.01 | methylene |
| 2.691 | s | | 2.09 | methylene |
| 2.14 | s | | 3.23 | Acetyl |
| 1.126 | s | | 6.10 | Dimethyl at C |

Example A6

Preparation of the Compound of Formula (106)

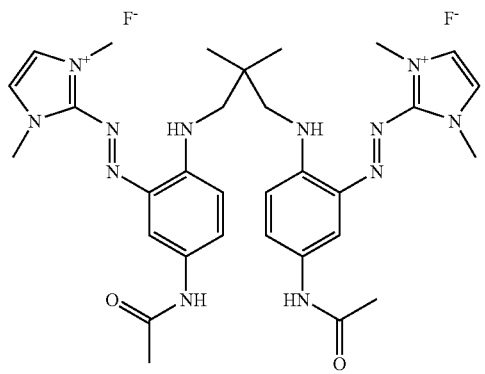

14.3 g of the compound of formula (101b) are added under nitrogen atmosphere at 293K to a stirred mixture of 4 g triethylamine 2.04 g 2.2-dimethyl-1,3-diamino-propane and 100 g isopropanol. The temperature is raised to 333K. The reaction mixture is stirred for 16 hours at this temperature under nitrogen and normal pressure. The reaction mass is stirred for for 4 hours, while the temperature is decreased to 295K, filtered off and the filter residue is washed with 30 ml of isopropanol and dried in vacuum to obtain 12 g of the product of formula (106).

The product is characterized by $^1$H-NMR Data in deuterated methanol (128 scans)/360 MHz

| 7.772 | dd | 8.3 | 2.04 | |
| | | 1.4 | | |
| 7.588 | s | | 4.00 | imidazol |
| 7.450 | m | | 1.97 | |
| 7.156 | d | 9.0 | 2.10 | |
| 6.808 | m | | 2.05 | |
| 4.018 | s | | 11.78 | Dimethyl at the imidazol |
| 3.659 | s | | 4.01 | methylene |
| 1.219 | s | | 6.03 | methyl |

Example A7

Preparation of the Compound of Formula (107)

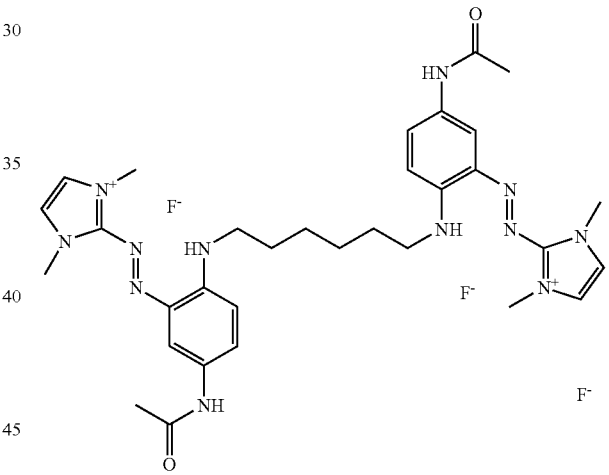

14.3 g of the compound of formula (101b) are added under nitrogen atmosphere at 293K to stirred mixture of 2.3 g 1,6-diaminohexane, 4 g triethylamine and 100 g isopropanol. The temperature is raised to 343K. The reaction mixture is stirred for 16 hours at this temperature under nitrogen and normal pressure. The reaction mass is stirred for 4 hours, while the temperature is decreased to 295K. The reaction mass is filtered off and the filter residue is washed with 30 ml isopropanol and dried in vacuum to obtain 10.6 g of product of formula (107).

The product is characterized by 1H—NMR Data in deuterated methanol (128 scans)/360 MHz

| 7.885 | dd | 8.6 | 2.023 | |
| | | 1.5 | | |
| 7.582 | s | | 4.00 | imidazol |
| 7.493 | m | | 2.003 | |

-continued

| 7.064 | d | 8.5 | 1.97 | |
| 6.842 | m | | 2.06 | |
| 4.045 | s | | 11.86 | dimethyl |
| 3.54 | t | | 4.18 | methylene |
| 1.83 | m | | 4.10 | methylene |
| 1.58 | m | | 3.95 | methylene |

Example A8

Preparation of the Compound of Formula (108)

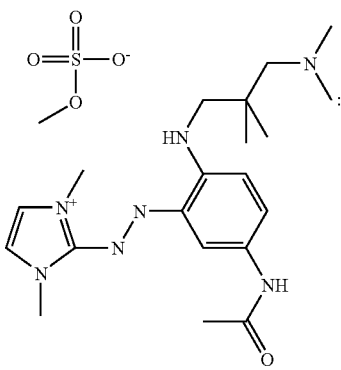

14.3 g of the compound of formula (101b) are added under nitrogen atmosphere at 293K to a stirred mixture of 5.2 g 2,2,N,N-tetramethyl-1,3-diaminopropane and 100 g acetonitrile. The temperature is raised to 333K. The reaction mixture is stirred for 3 hours at this temperature under nitrogen and atmospheric pressure.

Then the reaction mass is stirred for 4 hours while the temperature is decreased to 295K.

The reaction mass is filtered off and the filter residue is washed with 30 ml acetonitrile and dried in vacuum to obtain 10.6 g of the product of formula (108).

The product is characterized by 1H—NMR Data in deuterated methanol (128 scans)/360 MHz

| 8.06 | d | 1.8 | 1.10 | |
| 7.609 | s | | 1.99 | imidazole |
| 7.520 | m | | 1.20 | |
| 7.175 | d | 8.6 | 1.02 | |
| 4.084 | s | | 6.15 | dimethyl at the imidazole |
| 3.686 | s | | | MMS |
| 3.476 | s | | 2.01 | methylene |
| 3.106 | s | | 2.09 | methylene |
| 2.854 | s | | 5.92 | methyl-at N |
| 2.14 | s | | 3.32 | Acetyl |
| 1.121 | s | | 6.10 | Dimethyl at C |

Example 9

Preparation of the Compound of Formula (109)

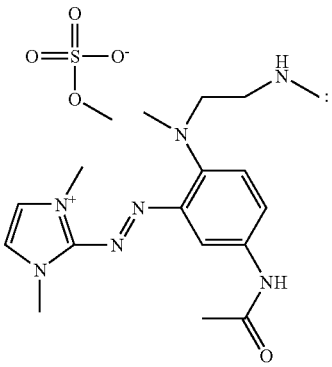

18.6 g of the compound of formula (101b) are added under nitrogen atmosphere at 293K to a stirred mixture of 13.4 g N,N'-dimethylaminoethylamine and 70 g acetonitrile. The reaction mixture is stirred for 24 hours at this temperature under atmospheric pressure. The reaction mass is filtered off and the filter cake is washed with 15 ml of acetonitrile and dried in vacuum to obtain 17.8 g of the compound of formula (109).

The product is characterized by 1H—NMR Data in deuterated methanol (128 scans)/360 MHz

| 8.13 | D, j = 2.7 | 0.984 | orto |
| 7.6 overlaid | d, d | 3.12 | para |
| 7.58 | s | | Imidazole |
| 7.027 | D j = 9.5 | 1.05 | meta |
| 4.089 | s | 6.4 | methyl |
| 3.69 | S, overlaid | 4.38 | methylsulfate |
| 3.56 | T; j = 6 | 2.22 | |
| 2.89 | T; j = 6 | 2.23 | |
| 2.285 | s | 6. | |
| 2.14 | s | 3.24 | acetyl |

Example 10

Preparation of the Compound of Formula (110)

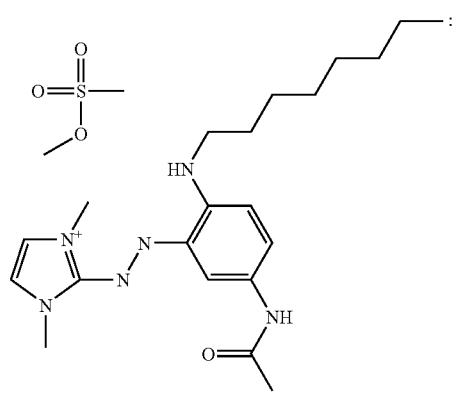

18.3 g of compound of formula (101b) are added under nitrogen atmosphere at 293K to a stirred mixture of 7.3 g octylamine and 100 g acetonitrile. The reaction mixture is stirred for 8 hours at this temperature under atmospheric pressure. The reaction mass is filtered off and the filter residue is washed with 45 ml acetonitrile and dried in vacuum to obtain 15.6 g of the compound of formula (110).

The product is characterized by $^1$H-NMR Data in deuterated methanol (128 scans)/360 MHz

| | | | |
|---|---|---|---|
| 8.12 | D, j = 2.7 | 1.00 | orto |
| 7.6 überlagert | d, d j = 2.7; 9.5 | 3.19 | para |
| 7.57 | s | | Imidazol |
| 7.00 | D j = 9.5 | 1.11 | meta |
| 4.045 | s | 6.56 | methyl |
| 3.69 | s | 3.29 | methylsulfat |
| 3.51 | s | 2.39 | |
| 2.14 | s | 3.45 | acetyl |
| 1.77 | m | 2.31 | |
| 1.3 | m | 13 | |

Example 11

Preparation of the Compound of Formula (111)

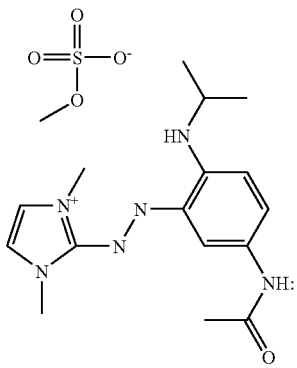

18.8 g of compound of formula (101b) are added under nitrogen atmosphere at 293K to a stirred mixture of 8.9 g isopropylamine and 70 g acetonitrile. The reaction mixture is stirred for 48 hours at this temperature under normal pressure. The reaction mass is filtered off and the filter residue is washed with 45 ml acetonitrile and dried in vacuum to obtain 15.1 g of tzhe compound of formula (111).

The product is characterized by $^1$H-NMR Data in deuterated methanol (128 scans)/360 MHz:

| | | | |
|---|---|---|---|
| 8.119 | D, j = 2.7 | 1.00 | orto |
| 7.6 überlagert | d, d j = 2.7, j = 2.7 | 3.11 | para |
| 7.574 | s | | imidazole |
| 7.085 | D j = 9.5 | 1.06 | meta |
| 4.105 | he | 1.09 | isopropyl |
| 4.050 | s | 6.22 | methyl |
| 3.69 | s | 3.00 | methylsulfate |
| 2.145 | s | 3.59 | acetyl |
| 1.380 | D j = 6.2 | 6.29 | isopropyl |

Example 12

Preparation of the Compound of Formula (112)

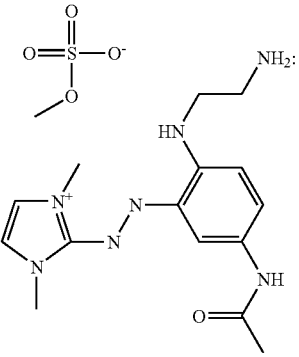

18.8 g of compound of formula (101b) are added under nitrogen atmosphere at 293K to a stirred mixture of 10.8 g ethylendiamine and 80 g acetonitrile. The reaction mixture is stirred for 10 hours at this temperature under atmospheric pressure. The reaction mass is filtered off and the filter cake is washed with 15 ml acetonitrile and dried in vacuum to obtain 19.0 g of compound of formula (112).

The product is characterized by $^1$H-NMR Data in deuterated methanol (128 scans)/360 MHz

| | | | |
|---|---|---|---|
| 8.135 | D, j = 2.7 | 1.00 | orto |
| 7.6 überlagert | d, d | 3.079 | para |
| 7.577 | s | | Imidazole |
| 7.077 | D j = 9.5 | 1.036 | meta |
| 4.198 | | 0.53 | |
| 4.077 | s | 6.45 | methyl |
| 3.875 | T; j = 6 | 2.4 | methylene |
| 3.69 | s | 3.50 | methylsulfate |
| 3.621 | T; j = 6 | 2.25 | methylene |
| 2.145 | s | 3.29 | acetyl |

Example 13

Preparation of the Compound of Formula (113)

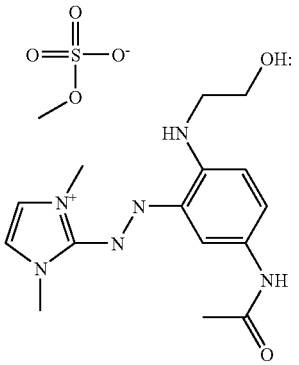

18.8 g of compound of formula (101b) are added under nitrogen atmosphere at 293K to a stirred mixture of 5 g triethylamine, 5.0 g ethanolamine and 70 g acetonitrile. The reaction mixture is stirred for 18 hours at this temperature under atmospheric pressure. The reaction mass is filtered off and the filter cake is washed with 15 ml acetonitrile and dried in vacuum to obtain 19.0 g of a blue product of formula (113).

The product is characterized by ¹H-NMR Data in deuterated methanol (128 scans)/360 MHz:

| 8.14 | d | 2.7 | 1.06 | O |
|------|---|-----|------|---|
| 7.60 | s |     | 2.00 | Imidazol |
| 7.58 | dd | 2.7, 8.5 | 1.00 | P |
| 7.092 | d | 8.5 | 1.04 | m |
| 4.080 | s |    | 6.28 | dimethyl at limidazole |
| 3.890 | t | 6.2 | 2.3 | methylene |
| 3.690 | s |    | 4.01 | methy freom MMS |
| 3.63 | t | 7.6 | 2.24 | metylene |
| 2.14 | s |    | 3.29 | acetyl |

Example 14

Preparation of the Compound of Formula (114)

100 g 4-fluoro-3-nitro-anilin are added to a stirred mass of 80 g methanol and heated to 333K. 0.1 ml sulfuric acid and 90 ml of propionic anhydride are added during 15 minutes. Heating and boiling are continued for 15 minutes. The reaction mixture is cooled slowly to 273K under stirring. At the final temperature stirring is continued for 30 minutes. The suspension is filtered off, washed with cold methanol, dryed in the vacuum dryer getting 114 g of the acetyl derivative which is worked up further. The acetyl derivative is diluted in 520 ml ethanol and continuously added to a mixture of 130 g iron in 35 ml concentrated hydrochloric acid and 220 ml water at 363K during 1 hour. The temperature drops to 353K. The reaction mixture is stirred for further 3 hours. The hot mass is separated through filtration, the residue washed with 100 ml ethanol. The filtrate and wash solution are cooled to 380K with mixing, when cristallization of the product takes place. The product is separated by filtration, washed with cold ethanol and dryed in a vacuum dryer. The dried material is dissolved in 132 ml water and 110 ml of 32% hydrochloric acid at 295K. The reaction mixture is cooled to 273K and 86.4 g 36% sodium nitrite solution are dropped at such a rate that the temperature of the mixture is maintained in the range of 273 to 276K. After the addition of the sodium nitrite solution the mixture is stirred for one hour. If no excess of nitrite is detected during one hour (detection by using a potassium iodide/starch paper) further amounts of sodium nitrite solution are added. The remaining excess of nitrite is destroyed with sulfamic acid. The obtained diazo solution is dropped to a 273K cold solution of 33.4 g imidazole in 130 ml water, whereby the pH of the solution is maintained between 10 to 11 by adding of a 36% sodium hydroxide solution. After completion the diazo addition the obtained suspension is warmed up to 295K and the pH is adjusted to 10.5 with a 36% sodium hydroxide solution. After one hour stirring at this pH and temperature the suspension is filtered off and washed twice with 100 ml water to obtain 200 g of the humid product The filtercake from the previous step is suspended in water. 3 weight equivalents dimethylsulfate and sodium hydroxide are simultaneously added for maintaining the pH in the range of 10-10.3 and the temperature at 300K. The reaction mixture is hold for one more hour to finish the hydrolysis of excess of dimethylsulfate. The suspension is separated by filtration. About 240 g of a humid solid which gives 140 g of the dry product of formula (114a):

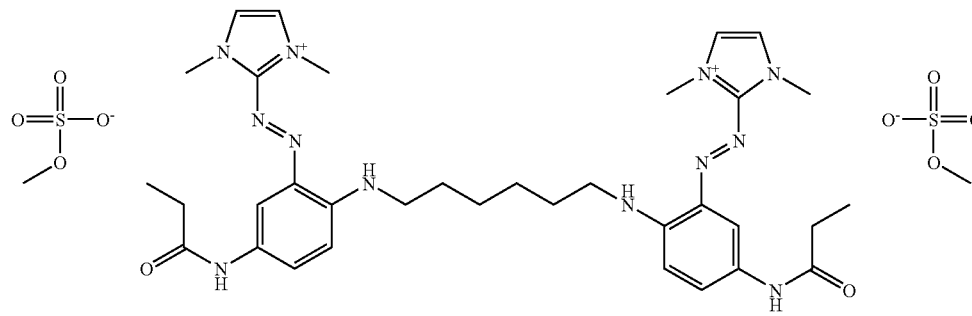

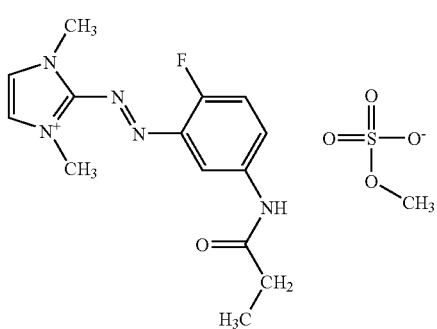

are obtained.

Characterization by ¹H-NMR Data in deuterated methanol (128 scans)/360 MHz

|       |           |      | Residue of compound |
|-------|-----------|------|---------------------|
| 8.415 | D, j = 2.7; 6.6 | 0.95 | ortho coupling |
| 7.889 | s         | 2.00 | imidazole |
| 7.820 | d, d, d;  | 0.98 | para coupling |
| 7.468 | D, d j = 9.5:9.5 | 1.04 | meta coupling |
| 4.203 | s         | 6.22 | methyl |

-continued

|      |              |      | Residue of compound |
|------|--------------|------|---------------------|
| 3.69 | s            | 3.00 | methylsulfate       |
| 2.175| q            | 2.22 | propionyl           |
| 1.20 | t            | 3.28 | propionyl           |

18.8 g of the educt are added under nitrogen atmosphere at 293K to a stirred mixture of 5.6 g of diaminohexane in 15 g triethylamine and 70 g acetonitrile. The temperature is maintained at 273K. The reaction mixture is stirred for 20 hour at this temperature. The reaction mass is filtered off and the filter residue is washed with 45 ml of acetonitrile and dried in vacuum to obtain 12.6 g of product of formula (104).

Characterized by $^1$H-NMR Data in deuterated methanol (128 scans)/360 MHz

|             |                       |       | Residue of compound (104) |
|-------------|-----------------------|-------|---------------------------|
| 8.11        | d, j = 1.7            | 2.00  | ortho coupling            |
| 7.6 overlaid| d, d, J = 8.6; j = 1.4| 6.06  | para coupling             |
| 7.57        | S                     |       | imidazolr                 |
| 7.00        | d, j = 9.5            | 2.04  | meta coupling             |
| 4.03        | S                     | 12.22 | methyl                    |
| 3.860       | t                     | 3.89  | methylene                 |
| 3.69        | s                     | 6.44  | methylsulfatr             |
| 3.1         | m                     | 12.28 | methylene                 |
| 2.14        | q                     | 4.22  | propionyl                 |
| 1.20        | t                     | 6.27  | propionyl                 |

Example 15

Preparation of the Compound of Formula (115)

100 g 4-fluoro-3nitro-aniline are added to a stirred mass of 80 g methanol and heated to 333K. 0.1 ml sulfuric acid and 90 ml of benzoyl chloride are added during 15 minutes. Heating and boiling are continued for 15 minutes. The reaction mixture is cooled slowly to 273K under stirring. At the final temperature stirring is continued for 30 minutes, then the suspension is filtered, washed with cold methanol, dryed in the vacuum dryer to obtain 114 g of the acetyl derivative which is worked up further. The acetyl derivative is dissolved in 520 ml ethanol and continuously added to 130 g iron in a mixture of 35 ml concentrated hydrochloric acid and 220 ml water at 363K during 1 hour. The temperature drops to 353K. The reaction mixture is stirred for further 3 hours. The hot mass is separated through filtration, the residue washed with 100 ml ethanol. The filtrate and wash solution are cooled to 380K with mixing, when cristallization of the product takes place. The product is separated by filtration, washed with cold ethanol and dryed in a vacuum dryer. The dried material is dissolved in 132 ml water and 110 ml of 32% hydrochloric acid at 295K. The reaction mixture is cooled to 273K and 86.4 g 36% sodium nitrite solution are dropped at such a rate that the temperature of the mixture is maintained in the range of 273 to 276K. After the addition of the sodium nitrite solution the mixture is stirred for one hour. If no excess of nitrite is detected during one hour (detection by using a potassium iodide/starch paper), further amounts of sodium nitrite solution are added. The remaining excess of nitrite is destroyed with sulfamic acid. The obtained diazo solution is dropped to a 273K cold solution of 33.4 g imidazole in 130 ml water whereby the pH of the solution is maintained in the range of pH 10 to 11 by adding 36% sodium hydroxide solution. After completing the diazo addition the obtained suspension is warmed up to 295K and the pH is adjusted to 10.5 with 36% sodium hydroxide solution. After one hour of stirring at this pH and temperature the suspension is filtered off and then washed twice with 100 ml water to obtain 200 g of the humid product. The filtercake from the previous step is suspended in water and 3 weight equivalents dimethylsulfate and sodium hydroxide are simultaneously added to maintain the pH in the range of 10-10.3 and the temperature at 300K. The reaction mixture is hold for one more hour to finish the hydrolysis of excess of dimethylsulfate. The suspension is separated by filtration.

About 240 g of a humid solid is obtained, which gives 140 g drye product of formula

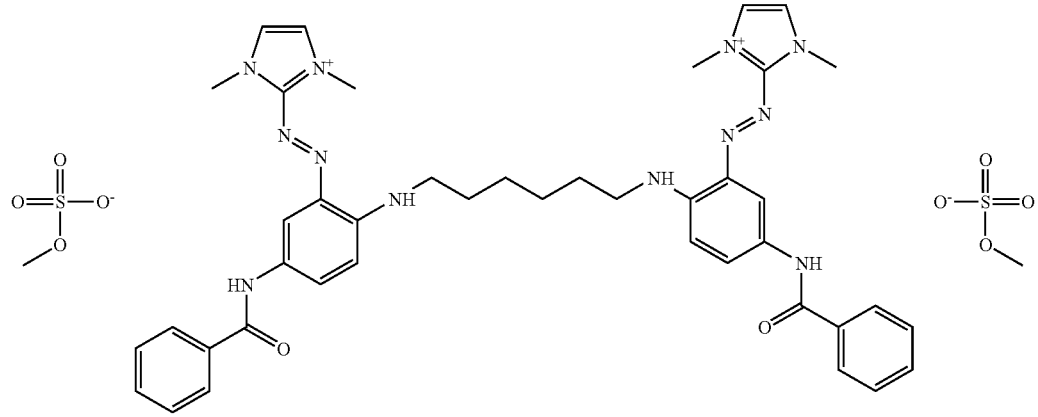

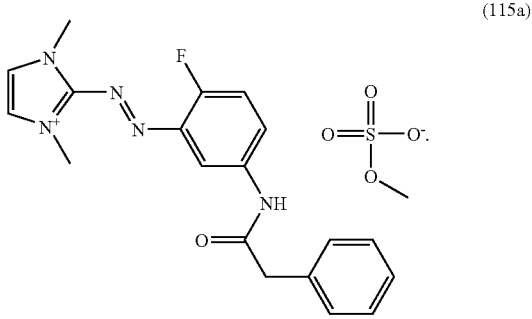

(115a)

This product is characterized by $^1$H-NMR Data in deuterated methanol (128 scans)/360 MHz

| | | | Residue of compound |
|---|---|---|---|
| 8.415 | D, j = 2.7; 6.6 | 0.95 | ortho coupling |
| 7.889 | s | 2.00 | Imidazole |
| 7.820 | d, d, d; | 0.98 | para coupling |
| 7.468 | D, d j = 9.5:9.5 | 1.04 | meta coupling |
| 4.203 | s | 6.22 | methyl |
| 3.69 | s | 3.00 | methylsulfat |

22.8 g of th compound of formula (115a) are added under nitrogen atmosphere at 293K to a stirred mixture of 5.6 g of diaminohexane in 15 g triethylamine and 70 g acetonitrile. The temperature is maintained at 273K. The reaction mixture is stirred at this temperature for 20 hours. The reaction mass is filtered off and the filter residue is washed with 45 ml of acetonitrile and dried in vacuum to obtain 12.6 g of product of formula (115).

This product is characterized by $^1$H-NMR Data in deuterated methanol (128 scans)/360 MHz

| | | | Residue of compound |
|---|---|---|---|
| 8.11 | d, j = 1.7 | 2.00 | ortho coupling |
| 7.6 overlaid | d, d, J = 8.6; j = 1.4 | 6.06 | para coupling |
| 7.57 | S | | imidazole coupling |
| 7.00 | d, j = 9.5 | 2.04 | meta coupling |
| 4.03 | s | 12.22 | methyl |
| 3.860 | m | 11.89 | methylene |
| 3.69 | s | 6.44 | methylsulfate |
| 3.109 | t | 4.28 | methylene |

Compositions FC-FG are prepared (values in the chart are given in parts by weight)

| Compositions | F-C | F-D01-F-D23 | F-E06-F-E24 | F-F* | F-G10-F-G23 |
|---|---|---|---|---|---|
| cetyl stearyl alcohol | 11.00 | 11.00 | 11.00 | | 11.00 |
| Oleth-5 | 5.0 | 5.0 | 5.0 | | 5.0 |
| oleic acid | 2.5 | 2.5 | 2.5 | | 2.5 |
| stearic acid monoethanolamide | 2.5 | 2.5 | 2.5 | | 2.5 |
| coconut fatty acid monoethanolamide | 2.5 | 2.5 | 2.5 | | 2.5 |
| sodium lauryl sulfate | 1.7 | 1.7 | 1.7 | | 1.7 |
| 1,2-propanediol | 1.0 | 1.0 | 1.0 | | 1.0 |
| ammonium chloride | 0.5 | 0.5 | 0.5 | | 0.5 |
| EDTA, tetrasodium salt | 0.2 | 0.2 | 0.2 | | 0.2 |
| perfume | 0.4 | 0.4 | 0.4 | | 0.4 |
| wheat protein hydrolysate | 0.2 | 0.2 | 0.2 | | 0.2 |
| Silica | 0.1 | 0.1 | 0.1 | | 0.1 |
| 2,5-diaminotoluene sulfate | 0.7 | | 0.7 | | |
| 4-amino-2-hydroxytoluene | 0.5 | | 0.5 | | |
| 2,5,6-triamino-4-hydroxypyrimidine sulfate | 0.2 | | 0.2 | | |
| sodium sulfite | 1.0 | | 1.0 | | |
| ascorbic acid | 0.5 | | 0.5 | | |
| Direct dye** | | 0.4 | | | |
| Direct dye*** | | | | | 0.4 |
| Direct dye**** | | | 0.4 | | |
| Black Color No. 401 | | | | 0.1 | |
| Purple Color 401 | | | | 0.05 | |
| Orange Color No. 205 | | | | 0.1 | |
| benzyl alcohol | | | | 2.0 | |
| ethylene carbonate | | | | 10 | |
| propylene carbonate | | | | 15 | |
| Ethanol | | | | 10 | |
| Lactic acid | | | | 3.5 | |
| sodium carbonate solution | | | | pH 2.9 | |
| hydroxyethyl cellulose | | | | 1.5 | |
| Ammonia (25%) | 9.2 | 9.2 | 9.2 | | 9.2 |
| composition: pH | 9.8 | 9.8 | 9.8 | | 9.8 |
| Water | ad 100 | ad 100 | ad 100 | ad 100 | ad 100 |

*F: dye mixture known from U.S. Pat. No. 6 248 314

The dye formulations FD-01-FD-23, FE-06-FE-23 and FG-10-FG-23 comprise the following dyes or dye combinations:

| Formulation | | | Dye of the prior art | Dye according to the present invention |
|---|---|---|---|---|
| FD-01 | | | Basic Yellow 87 | |
| FD-02 | | | Basic Orange 31 | |
| FD-03 | | | Basic Red 51 | |
| FD-04 | | | cationic dye of example 4 of WO 01/66646 | |
| FD-05 | | | cationic dye of example 6, compound of formula 106 fromWO 02/31056; | |
| FD-06 | FE-06 | | dye of formula (DD-01), wherein $R_1$ is methyl, $R_2$ is benzyl and $R_3$ is hydrogen | |
| FD-07 | FE-07 | | cationic dye of example 6, compound of formula 106 of WO 02/31056 | |
| FD-08 | FE-08 | | compound of formula (DD-01), wherein $R_1$ is benzyl, $R_2$ is methyl, $R_3$ is hydrogen | |
| FD-09 | FE-09 | | cationic dye of formula (3) of EP-A-714,954 | |
| FD-10 | FE-10 | FG-10 | | compound of formula (101a) |

-continued

| Formulation | | | Dye of the prior art | Dye according to the present invention |
|---|---|---|---|---|
| FD-11 | FE-11 | FG-11 | | compound of formula (102) |
| FD-12 | FE-12 | FG-12 | | compound of formula (103) |
| FD-13 | FE-13 | FG-13 | | compound of formula (104) |
| FD-14 | FE-14 | FG-14 | | compound of formula (105) |
| FD-15 | FE-15 | FG-15 | | compound of formula (106) |
| FD-16 | FE-16 | FG-16 | | compound of formula (107) |
| FD-17 | FE-17 | FG-17 | | compound of formula (108) |
| FD-18 | FE-18 | FG-18 | | compound of formula (109) |
| FD-19 | FE-19 | FG-19 | | compound of formula (110) |
| FD-20 | FE-20 | FG-20 | | compound of formula (111) |
| FD-21 | FE-21 | FG-21 | | compound of formula (112) |
| FD-22 | FE-22 | FG-22 | | compound of formula (113) |
| FD-23 | FE-23 | FG-23 | | compound of formula (114) |

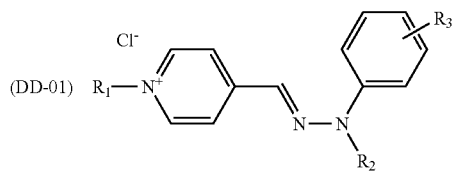

(DD-01)

Example F-01

A strand of middle blond undamaged human hair is dyed
F-01a) with a mixture of 20 g of 6% hydrogen peroxide solution and the composition F-G14; or
F-01b) first with 20 g of 6% hydrogen peroxide solution and then with 5 g of the composition G14; or
F-01c) first with 5 g of the F-G14 and then with 20 g of 6% hydrogen peroxide solution.

The dyeing mixture is allowed to act on the hair for 30 minutes at about 22° C. 10 g of a 2% aqueous citric acid gel are then applied to the strand. After a contact time of 5 minutes the strand is rinsed thoroughly, shampooed and then dried. A strong, intense, striking red dyeing having good fastness to washing and fastness to rubbing properties is obtained.

Example F-02

A strand of blond undamaged human hair is dyed with a composition consisting of 5 g of the composition-F-G16.

The dyeing mixture is allowed to act on the hair for 30 minutes at about 22° C. 10 g of a 2% aqueous citric acid gel are then applied to the strand. After a contact time of 5 minutes the strand is rinsed thoroughly, shampooed and then dried. A strong, intense, striking red dyeing having good fastness to washing and fastness to rubbing properties is obtained.

Example F-02a

F-G16 is replaced by F-G14.

Example F-03

A strand of middle blond undamaged human hair is dyed
F-03a) with a mixture of 15 g of 6% hydrogen peroxide solution and the composition F-G10;
F-03b) first with 15 g of 6% hydrogen peroxide solution, and then with 5 g of the composition F-G10;
F-03c) first with 5 g of the composition F-G10, and then with 15 g of 6% hydrogen peroxide solution.

The dyeing mixture is allowed to act on the hair for 30 minutes at about 22° C. 10 g of a 2% aqueous citric acid gel are then applied to the strand.

After a contact time of 5 minutes the strand is rinsed thoroughly, shampooed and dried. A strong, intense, striking red dyeing having good fastness to washing and fastness to rubbing properties is obtained.

Example F-03a$_1$

F-G10 is replaced by F-G11.

Example F-03a$_2$

F-G10 is replaced by F-G16.

Example F-03b$_1$

F-G10 is replaced by F-G12.

Example F-03b$_2$

F-G10 is replaced by F-G14.

Example F-03c$_1$

F-G10 is replaced by F-G16.

Example F-03c$_2$

F-G10 is replaced by F-G17.

Example F-04

A strand of middle blond undamaged human hair is dyed
F-04a) with a mixture of 15 g of 6% hydrogen peroxide solution and a composition consisting of 5 g of the composition F-G20, and alternatively
F-04b) first with 15 g of 6% hydrogen peroxide solution, and then with 5 g the composition F-G20, or
F-04c) first with 5 g of the composition G20, and then with 15 g of 6% hydrogen peroxide solution.

The dyeing mixture is allowed to act on the hair for 30 minutes at about 22° C. 10 g of a 2% aqueous citric acid gel are then applied to the strand. After a contact time of 5 minutes the strand is rinsed thoroughly, shampooed and dried.

A strong, intense, striking red dyeing having good fastness to washing and fastness to rubbing properties is obtained.

Example F-04a$_1$

F-G20 is replaced by F-G14.

Example F-04a$_2$

F-G20 is replaced by F-G16.

Example F-04b$_1$

F-G20 is replaced by F-G21.

Example F-04b$_2$

F-G20 is replaced by F-G15.

Example F-04c$_1$

F-G20 is replaced by F-G13.

Example F-04c$_2$

F-G20 is replaced by F-G18.

Example F-05

A strand of blond undamaged human hair is dyed
F-05a) with a mixture of 10 g of 6% hydrogen peroxide solution and a composition consisting of 5 g of the composition F-G16;
F-05b) with 10 g of a 6% hydrogen peroxide solution and 5 g of the composition F-G16.

The dyeing mixture is allowed to act on the hair for 30 minutes at about 22° C. 10 g of a 2% aqueous citric acid gel are then applied to the strand. After a contact time of 5 minutes, the strand is rinsed thoroughly, shampooed and then dried. A strong, intense, striking bluish red dyeing having good fastness to washing and fastness to rubbing properties is obtained.

Example F-05a$_1$

F-G16 is replaced by F-G15.

Example F-05a$_2$

F-G16 is replaced by F-G13.

Example F-05b$_1$

F-G16 is replaced by F-G19.

Example F-05b$_2$

F-G16 is replaced by F-G17.

Example F-06

A strand of blond undamaged human hair is dyed
F-06a) with a mixture of 10 g of a 6% hydrogen peroxide solution and a composition consisting of 5 g each of compositions F-D1 and F-E14, and alternatively
F-06b) first with 10 g of a 6% hydrogen peroxide solution, and then with 5 g of composition F-D1 and 5 g of composition F-E14, or
F-06c) first with 5 g of composition F-D1 and 5 g of composition F-E14, and then with 10 g of 6% hydrogen peroxide solution.

The dyeing mixture is allowed to act on the hair for 30 minutes at about 22° C. 10 g of a 2% aqueous citric acid gel are then applied to the strand. After contact for 5 minutes, the strand is rinsed thoroughly, shampooed and then dried. A strong, intense, striking bluish red dyeing having good fastness to washing and fastness to rubbing properties is obtained.

Example F-06a$_1$

F-D1 is replaced by F-D2.

Example F-06a$_2$

F-D1 is replaced by F-D3.

Example F-06a$_3$

F-D1 is replaced by F-D4.

Example F-06a$_4$

F-D1 is replaced by F-D5.

Example F-06a$_5$

F-E14 is replaced by F-E12.

Example F-06a$_6$

F-E14 is replaced by F-E19.

Example F-06a$_7$

F-E14 is replaced by F-E16.

Example F-06b$_1$

F-D1 is replaced by F-D2.

Example F-06b$_2$

F-D1 is replaced by F-D3.

Example F-06b$_3$

F-D1 is replaced by F-D4.

Example F-06b$_4$

F-D1 is replaced by F-D5.

Example F-06b$_5$

F-E14 is replaced by F-E15.

Example F-06b$_6$

F-E14 is replaced by F-E12.

Example F-06b₇

F-E14 is replaced by F-E16.

Example F-06c₁

F-D1 is replaced by F-D2.

Example F-06c₂

F-D1 is replaced by F-D3.

Example F-06c₃

F-D1 is replaced by F-D4.

Example F-06c₄

F-DE is replaced by F-D5.

Example F-06c₅

F-E14 is replaced by F-E19.

Example F-06c₆

F-E14 is replaced by F-E16.

Example F-06c₇

F-E4 is replaced by F-E12.

Example F-07

A strand of brown undamaged human hair is dyed
F-07a) with a mixture of 10 g of 6% hydrogen peroxide solution and a composition consisting of 5 g of the composition F-E11; or
F-07b) first with 10 g of 6% hydrogen peroxide solution, and then with 5 g of the composition F-E11; or
F-07c) first with 5 g of the composition F-E11, and then with 10 g of 6% hydrogen peroxide solution.

The dyeing mixture is allowed to act on the hair for 30 minutes at about 22° C. 10 g of a 2% aqueous citric acid gel are then applied to the strand. After a contact time of 5 minutes the strand is rinsed thoroughly, shampooed and then dried. A strong, intense, striking bluish red dyeing having good fastness to washing and fastness to rubbing properties is obtained.

Example F-07a₁

F-E11 is replaced by F-E12.

Example F-07a₂

F-E11 is replaced by F-E19.

Example F-07a₃

F-E11 is replaced by F-E16.

Example F-07b₁

F-E11 is replaced by E15.

Example F-07b₂

F-E11 is replaced by F-E19.

Example F-07b₃

F-E11 is replaced by F-E12.

Example F-07c₁

F-E11 is replaced by F-E12.

Example F-07c₂

F-E11 is replaced by F-E19.

Example F-07c₃

F-E11 is replaced by F-E15.

Example F-08

A strand of blond undamaged human hair is dyed
F-08a) with a mixture of 5 g of a 6% hydrogen peroxide solution and 5 g of the composition F-G16; or
F-08b) first with 5 g of a 6% hydrogen peroxide solution, and then with 5 g of the composition F-G16; or
F-08c) first with 5 g of a composition F-G16 and then with 5 g of a 6% hydrogen peroxide solution.

The dyeing mixture is allowed to act on the hair for 30 minutes at about 22° C. After a contact time of 30 minutes without being washed out, 10 g of the dye mixture F-F is applied to the hair. The hair is then combed thoroughly, whereupon its pH becomes about 3. After a contact time of 15 minutes the hair is rinsed thoroughly with water and dried.

Example F-08a₁

F-G16 is replaced by F-G15.

Example F-08a₂

F-G16 is replaced by F-G17.

Example F-09

A strand of blond undamaged human hair is dyed with 10 g of composition F-G16. The dyeing composition is allowed to act on the hair for 30 minutes at about 22° C. After a contact time of 30 minutes without being washed out, 10 g of the dye mixture F-F is applied to the hair. The hair is then combed thoroughly, whereupon its pH becomes about 3. After a contact time of 15 minutes the hair is rinsed thoroughly with water and dried.

Example F-09a

F-G16 is replaced by G15.

Example F-09b

F-G16 is replaced by F-G19.

Example F-10

A strand of blond undamaged human hair is dyed with 10 g of the composition F-G16. The dyeing composition is allowed to act on the hair for 30 minutes at about 22° C. After the contact period the strand is rinsed thoroughly, shampooed and dried.

A strong, intense, striking red dyeing having good fastness to washing and fastness to rubbing properties is obtained.

Example F-10a

F-G16 is replaced by F-G15.

Example F-10b

F-G16 is replaced by F-G19.

Example F-11

A strand of blond undamaged human hair is dyed
F-11a) with a mixture of 5 g of 6% hydrogen peroxide solution and 5 g of composition F-G16; or
F-11b) first with 5 g of 6% hydrogen peroxide solution, and then with 5 g of a composition F-G16; or
F-11 c) first with 5 g of a composition F-G16, and then with 5 g of 6% hydrogen peroxide solution.

The dyeing is allowed to act on the hair for 30 minutes at about 22° C. 10 g of a 2% aqueous citric acid gel are then applied to the strand. After a contact time of 15 minutes the strand is rinsed thoroughly, shampooed and then dried.

A strong, intense, striking red dyeing having good fastness to washing and fastness to rubbing properties is obtained.

Example F-11a$_1$

F-G16 is replaced by F-G15.

Example F-11a$_2$

F-G16 is replaced by F-G19.

Example F-11b$_1$

F-G16 is replaced by F-G14.

Example F-11b$_2$

F-G16 is replaced by F-G13.

Example F-11c$_1$

F-G16 is replaced by F-G17.

Example F-11c$_2$

F-G16 is replaced by F-G18.

Example F-12

A strand of blond undamaged human hair is dyed with 10 g of composition F-G16. Then the pH is adjusted in the range of pH 5 to 8 with adding citric acid. The dyeing mixture is allowed to act on the hair for 30 minutes at about 22° C. After contact the strand is rinsed thoroughly, shampooed and then dried.

A strong, intense, striking red dyeing having good fastness to washing and fastness to rubbing properties is obtained.

Example F-12a

F-G16 is replaced by F-G15.

Example F-12b

F-G16 is replaced by F-G13.

Example F-13

A strand of brown undamaged human hair is dyed
F-13a) with a mixture of 15 g of a 6% hydrogen peroxide solution and a composition consisting of 5 g each of the compositions F-D1 and F-E14; or
F-13b) first with 10 g of a 6% hydrogen peroxide solution, and then with 5 g each of the compositions F-D1 and F-E14; or
F-13c) first with 5 g each of compositions F-D1 and F-E14, then with 10 g of a 6% hydrogen peroxide solution.

The dyeing mixture is allowed to act on the hair for 30 minutes at about 22° C. 10 g of a 2% aqueous citric acid gel are then applied to the strand. After a contact time of 5 minutes, the strand is rinsed thoroughly, shampooed and then dried.

A strong, intense, striking bluish red dyeing having good fastness to washing and fastness to rubbing properties is obtained.

Example F-13a$_1$

F-D1 is replaced by F-D2.

Example F-13a$_2$

F-D1 is replaced by F-D3.

Example F-13a$_3$

F-D1 is replaced by F-D4.

Example F-13a$_4$

F-D1 is replaced by F-D5.

Example F-13a$_5$

F-E14 is replaced by F-E12.

Example F-13a$_6$

F-E14 is replaced by F-E16.

Example F-13a$_7$

F-E14 is replaced by F-E15.

Example F-13b$_1$

F-D1 is replaced by F-D2.

Example F-13b$_2$

F-D1 is replaced by F-D3.

Example F-13b$_3$

F-D1 is replaced by F-D4.

Example F-13b$_4$

F-D1 is replaced by F-D5.

Example F-13b$_5$

F-E14 is replaced by F-E12.

Example F-13b$_6$

F-E14 is replaced by F-E19.

Example F-13b$_7$

F-E14 is replaced by F-E15.

Example F-13c$_1$

F-D1 is replaced by F-D2.

Example F-13c$_2$

F-D1 is replaced by F-D3.

Example F-13c$_3$

F-D1 is replaced by F-D4.

Example F-13c$_4$

F-D1 is replaced by F-D5.

Example F-13c$_5$

F-E14 is replaced by F-E16.

Example F-13c$_6$

F-E14 is replaced by F-E12.

Example F-13G$_7$

F-E14 is replaced by F-E19.

Example F-14

A strand of blond undamaged human hair is dyed
F-14a) with a mixture of 5 g of a 6% hydrogen peroxide solution and a composition consisting of 5 g of composition F-E14; or
F-14b) first with 5 g of a 6% hydrogen peroxide solution, and then with 5 g of composition F-E14; or
F-14c) first with 5 g of composition F-E14 and then with 5 g of 6% hydrogen peroxide solution.

The dyeing mixture is allowed to act on the hair for 30 minutes at about 22° C. 10 g of a 2% aqueous citric acid gel are then applied to the strand. After a contact time of 5 minutes the strand is rinsed thoroughly, shampooed and then dried.

A strong, intense, striking bluish red dyeing having good fastness to washing and fastness to rubbing properties is obtained.

Example F-14a$_1$

F-E14 is replaced by F-E12.

Example F-14a$_2$

F-E14 is replaced by F-E19.

Example F-14a$_3$

F-E14 is replaced by F-E15.

Example F-14b$_1$

F-E14 is replaced by F-E16.

Example F-14b$_2$

F-E14 is replaced by F-E15.

Example F-14b$_3$

F-E14 is replaced by F-E12.

Example F-14c$_1$

F-E14 is replaced by F-E16.

Example F-14c$_2$

F-E14 is replaced by F-E19.

Example F-14c$_3$

F-E14 is replaced by F-E12.

Example F-15

A strand of blond undamaged human hair is dyed with 5 g of the following composition:

| | Example | | |
|---|---|---|---|
| | F-15a | F-15b | F-15c |
| behentrimonium chloride | 3.8 g | 3.8 g | 3.8 g |
| cetylalcohol | 4 g | 4 g | 4 g |
| phenoxyethanol and isobutylparaben | 0.5 g | 0.5 g | 0.5 g |
| perfume | 0.1 g | 0.1 g | 0.1 g |
| Dye of formula (104) | 0.5 g | | |
| Dye of formula (105), wherein X$^-$ is methylsulfate | | 0.5 g | |
| Dye of formula (106) | | | 0.5 g |
| Monoethanolamine | ad pH 6.5 | ad pH 6.5 | ad pH 6.5 |
| Water | ad 100 | ad 100 | ad 100 |

The dyeing mixture is allowed to act on the hair for 30 minutes at about 22° C. After the contact period the strand is rinsed and dried.

A strong, intense, striking blue dyeing having good fastness to washing and fastness to rubbing properties is obtained.

Example F-16

| COMPOSITION A | |
|---|---|
| sodium stearatee | 11.0 g |
| aluminium distearate | 2.7 g |
| sodium laurylsulfate (Duponol C) | 1.0 g |
| disperse silicic acid (Aerosil 200) | 9.1 g |
| hydroxypropylcellulose | 2.7 g |
| ammoniumpersulfate | 19.0 g |
| sodium metasilicate | 12.0 g |

-continued

| | |
|---|---|
| disodium salt of ethylentetramine acetic acid | 1.0 g |
| potassium persulfate | 31.5 g |
| COMPOSITION B | |
| water | 188 g |
| hydrogenperoxide | 12 g |

2 g of composition A and 3 g of composition B are mixed homogenously. This mixture is allowed to act on a strand of blond undamaged human hair for 30 minutes at about 22° C. After the contact period the strand is rinsed and shampooed. Then the hair is dyed with 5 g of the following compositions:

| | Example | | | |
|---|---|---|---|---|
| | F-16a | F-16b | F-16c | F-16d |
| behentrimonium chloride | 3.8 g | 3.8 g | 3.8 g | 3.8 g |
| cetylalcohol | 4 g | 4 g | 4 g | 4 g |
| phenoxyethanol and isobutylparabene | 0.5 g | 0.5 g | 0.5 g | 0.5 g |
| perfume | 0.1 g | 0.1 g | 0.1 g | 0.1 g |
| Dye of formula (107) | 0.5 g | | | |
| Dye of formula (108) | | 0.5 g | | |
| Dye of formula (109) | | | 0.5 g | |
| Dye of formula (110) | | | | 0.5 g |
| monoethanolamine | ad pH 6.5 | ad pH 6.5 | ad pH 6.5 | ad pH 6.5 |
| water | ad 100 | ad 100 | ad 100 | ad 100 |

The dyeing mixture is allowed to act on the hair for 30 minutes at about 22° C. After the contact period the strand is rinsed and dried. A strong, intense, striking dyeing having good fastness to washing and fastness to rubbing properties is obtained.

Example F-17

| | EXAMPLE | | | |
|---|---|---|---|---|
| COMPOSITION A | F-17a | F-17b | F-17c | F-17d |
| sodium stearate | 11.0 g | 11.0 g | 11.0 g | 11.0 g |
| aluminium distearate | 2.7 g | 2.7 g | 2.7 g | 2.7 g |
| sodium laurylsulfat (Duponol C) | 1.0 g | 1.0 g | 1.0 g | 1.0 g |
| disperse silicic acid (Aerosil 200) | 9.1 g | 9.1 g | 9.1 g | 9.1 g |
| hydroxypropylcellulose | 2.7 g | 2.7 g | 2.7 g | 2.7 g |
| Ammoniumpersulfate | 19.0 g | 19.0 g | 19.0 g | 19.0 g |

| | EXAMPLE | | | |
|---|---|---|---|---|
| COMPOSITION A | F-17a | F-17b | F-17c | F-17d |
| sodium metasilicate | 12.0 g | 12.0 g | 12.0 g | 12.0 g |
| disodium salt of ethylentetraminacetic acid | 1.0 g | 1.0 g | 1.0 g | 1.0 g |
| potassium persulfate | 31.5 g | 31.5 g | 31.5 g | 31.5 g |
| Dye of formula (102) | 10 g | | | |
| Dye of formula (103), wherein thee anion is acetate | | 10 g | | |
| Dye of formula (104) | | | 10 g | |
| Dye of formula (105), wherein thee anion is sulfate | | | | 10 g |

| COMPOSITION B | |
|---|---|
| Water | 188 g |
| Hydrogenperoxide | 12 g |

2 g of composition A and 4 g of composition B are mixed homogenously. This mixture is allowed to act on a strand of blond undamaged human hair for 30 minutes at about 22° C. After the contact period the strand is rinsed, shampooed and dried.

Example F-18

| COMPOSITION A | |
|---|---|
| sodium stearate | 11.0 g |
| aluminium distearate | 2.7 g |
| sodium laurylsulfate (Duponol C) | 1.0 g |
| disperse silicic acid (Aerosil 200) | 9.1 g |
| hydroxypropylcellulose | 2.7 g |
| ammoniumpersulfate | 19.0 g |
| sodium metasilicate | 12.0 g |
| disodium salt of ethylentetraminacetic acid | 1.0 g |
| potassium persulfate | 31.5 g |
| One of the dyes ** D1-D5 | 10 g |

| COMPOSITION B | |
|---|---|
| water | 188 g |
| Hydrogen peroxide | 12 g |

| | Example | | | | | | |
|---|---|---|---|---|---|---|---|
| | F-18a | F-18b | F-18c | F-18d | F-18d | F-187d | F-18d |
| behentrimonium chloride | 3.8 g | 3.8 g | 3.8 g | 3.8 g | 3.8 g | 3.8 g | 3.8 g |
| cetylalcohol | 4 g | 4 g | 4 g | 4 g | 4 g | 4 g | 4 g |
| phenoxyethanol and isobutylparaben | 0.5 g | 0.5 g | 0.5 g | 0.5 g | 0.5 g | 0.5 g | 0.5 g |
| perfume | 0.1 g | 0.1 g | 0.1 g | 0.1 g | 0.1 g | 0.1 g | 0.1 g |
| Dye of formula (103) | 0.5 g | | | | | | |
| Dye of formula (104), wherein the anion is chloride | | 0.5 g | | | | | |

-continued

| | Example | | | | | | |
|---|---|---|---|---|---|---|---|
| | F-18a | F-18b | F-18c | F-18d | F-18d | F-187d | F-18d |
| Dye of formula (105), wherein the anion is sulfate | | | 0.5 g | | | | |
| Dye of formula (106), wherein the anion is acetate | | | | 0.5 g | | | |
| Dye of formula (107), wherein the anion is acetate | | | | | 0.5 g | | |
| Dye of formula (106), wherein the anion is fluoride | | | | | | 0.5 g | |
| Dye of formula (107), wherein the anion is sulfate | | | | | | | 0.5 g |
| monoethanolamine | ad pH 6.5 | ad pH 6.5 | ad pH 6.5 | ad pH 6.5 | ad pH 6.5 | ad pH 6.5 | ad pH 6.5 |
| water | ad100 | ad100 | ad100 | ad100 | ad100 | ad100 | ad100 |

2 g of the composition A and 4 g of the composition B are mixed homogenously. This mixture is allowed to act on a strand of blond undamaged human hair for 30 minutes at about 22° C. After the contact period the strand is rinsed and shampooed. Then the hair is dyed with 5 g of the composition C. The dyeing mixture is allowed to act on the hair for 30 minutes at about 22° C. After the contact period the strand is rinsed and dried.

A strong, intense, striking dyeing having good fastness to washing and fastness to rubbing properties is obtained.

Example F-19

| COMPOSITION A | |
|---|---|
| sodium stearate | 11.0 g |
| aluminium distearate | 2.7 g |

| COMPOSITION A | |
|---|---|
| sodium laurylsulfate (Duponol C) | 1.0 g |
| disperse silicic acid (Aerosil 200) | 9.1 g |
| hydroxypropylcellulose | 2.7 g |
| ammoniumpersulfate | 19.0 g |
| sodium metasilicate | 12.0 g |
| disodium salt of ethylene tetraminacetic acid | 1.0 g |
| potassium persulfate | 31.5 g |

| COMPOSITION B | |
|---|---|
| water | 188 g |
| Hydrogen peroxide | 12 g |

| | Composition C | | | | | | | |
|---|---|---|---|---|---|---|---|---|
| | Example | | | | | | | |
| | F-19a | F-19b | F-19c | F-19d | F-19e | F-19f | F-19g | F-19h |
| cetyl stearyl alcohol | 11.00 | 11.00 | 11.00 | 11.00 | 11.00 | 11.00 | 11.00 | 11.00 |
| Oleth-5 | 5.0 | 5.0 | 5.0 | 5.0 | 5.0 | 5.0 | 5.0 | 5.0 |
| oleic acid | 2.5 | 2.5 | 2.5 | 2.5 | 2.5 | 2.5 | 2.5 | 2.5 |
| stearic acid monoethanolamide | 2.5 | 2.5 | 2.5 | 2.5 | 2.5 | 2.5 | 2.5 | 2.5 |
| coconut fatty acid monoethanolamide | 2.5 | 2.5 | 2.5 | 2.5 | 2.5 | 2.5 | 2.5 | 2.5 |
| sodium lauryl sulfate | 1.7 | 1.7 | 1.7 | 1.7 | 1.7 | 1.7 | 1.7 | 1.7 |
| 1,2-propanediol | 1.0 | 1.0 | 1.0 | 1.0 | 1.0 | 1.0 | 1.0 | 1.0 |
| ammonium chloride | 0.5 | 0.5 | 0.5 | 0.5 | 0.5 | 0.5 | 0.5 | 0.5 |
| EDTA, tetrasodium salt | 0.2 | 0.2 | 0.2 | 0.2 | 0.2 | 0.2 | 0.2 | 0.2 |
| perfume | 0.4 | 0.4 | 0.4 | 0.4 | 0.4 | 0.4 | 0.4 | 0.4 |
| wheat protein hydrolysate | 0.2 | 0.2 | 0.2 | 0.2 | 0.2 | 0.2 | 0.2 | 0.2 |
| Silica | 0.1 | 0.1 | 0.1 | 0.1 | 0.1 | 0.1 | 0.1 | 0.1 |
| 2,5-diaminotoluene sulfate | 0.7 | 0.7 | 0.7 | 0.7 | 0.7 | 0.7 | 0.7 | 0.7 |
| 4-amino-2-hydroxytoluene | 0.5 | 0.5 | 0.5 | 0.5 | 0.5 | 0.5 | 0.5 | 0.5 |
| 2,5,6-triamino-4-hydroxypyrimidine sulfate | 0.2 | 0.2 | 0.2 | 0.2 | 0.2 | 0.2 | 0.2 | 0.2 |

-continued

Composition C

| | Example | | | | | | | |
|---|---|---|---|---|---|---|---|---|
| | F-19a | F-19b | F-19c | F-19d | F-19e | F-19f | F-19g | F-19h |
| sodium sulfite | 1.0 | 1.0 | 1.0 | 1.0 | 1.0 | 1.0 | 1.0 | 1.0 |
| ascorbic acid | 0.5 | 0.5 | 0.5 | 0.5 | 0.5 | 0.5 | 0.5 | 0.5 |
| Dye of formula (105) | 0.4 | | | | | | | |
| Dye of formula (103) | | 0.4 | | | | | | |
| Dye of formula (106) | | | 0.4 | | | | | |
| Dye of formula (110) | | | | 0.4 | | | | |
| Dye of formula (101a) | | | | | 0.4 | | | |
| Dye of formula (103), wherein the anion is chloride | | | | | | 0.4 | | |
| Dye of formula (102), wherein the anion is chloride | | | | | | | 0.4 | |
| Dye of formula (105), wherein the anion is chloride | | | | | | | | 0.4 |
| Ammonia (25%) | 9.2 | 9.2 | 9.2 | 9.2 | 9.2 | 9.2 | 9.2 | 9.2 |
| composition: pH | 9.8 | 9.8 | 9.8 | 9.8 | 9.8 | 9.8 | 9.8 | 9.8 |
| Water | ad 100 | ad 100 | ad 100 | ad 100 | ad 100 | ad 100 | ad 100 | ad 100 |

2 g of the composition A, 2 g of the composition B and 6 g of composition C are mixed homogenously. This mixture is allowed to act on a strand of blond undamaged human hair for 30 minutes at about 22° C. After the contact period the strand is rinsed, shampooed and dried.

Example F-20

| Composition (A) | |
|---|---|
| polyglycerol alcohol with 2 mols of glycerol | 4.0 g |
| polyglycerol alcohol with 4 mols of glycerol of 78% (M.A.) | 5.69 g |
| oil acid | 3.0 g |
| oil amine with 2 mols ethylenoxide available from ETHOMEEN O12 from AKZO | 7.0 g |
| Laurylamine succinamate of diethylaminopropylene, salt of sodium with 55%. | 3.0 g |
| oil alcohol | 5.0 g |
| diethanolamide of oil acid | 12.0 g |
| propyleneglycol | 3.5 g |
| ethylenealcohol | 7.0 g |
| monobutylether of diethylenglycol | 0.5 g |
| monomethylether of propylenglycol | 0.5 g |
| Sodium metabisulfite as solution a 35% | 0.455 g |
| ammonium acetate | 0.8 g |
| paraphenylendiamine | 0.35 g |
| 1,3-dihydroxybenzene | 0.4 g |
| 3-amino phenol | 0.03 g |
| 2,4-diamino-1-(β-hydroxyethyloxy)benzene, 2HCl | 0.012 g |
| 1,3-bis-[(4-aminophenyl)2-hydroxyethyl)-amino]-2-propanol, 4HCl | 0.037 g |
| 1,3-dihydroxy-2-methyl-benzene | 0.2 g |
| antioxidant | qs |
| parfume | qs |
| ammonia 20% de NH$_3$ | 10.0 g |
| Water | 100 g |

| | Example | | | |
|---|---|---|---|---|
| COMPOSITION B | F-20a | F-20b | F-20c | F-20d |
| dye of formula (107) in powder form | 20 g | | | |
| dye of formula (108), wherin the anion is sulfyte | | 20 g | | |
| dye of formula (109), wherein the anion is acetate | | | 20 g | |
| dye of formula (109) | | | | 20 g |
| oil of parafine | | | | 3 g |
| cationic polymeric powder (Merquat 280 Dry de Calgon) | | | | 10 g |
| sawdust | | | | 100 g |

Composition (C):

| Hydrogen peroxide 20% by volume | 100 g |
|---|---|

Directly before the dyeing of human hair a mixture of 1 equivalent of weight of composition (A), 01 equivalent of weight of composition (B) and 1 equivalent of weight of composition (C) are mixed. The pH is adjusted to 9.8. The dyeing mixture is applied on human grey hair. This mixture is allowed to act on a strand of blond undamaged human hair for 30 minutes. After the contact period the strand is rinsed, shampooed and dried.

Example F-21

COMPOSITION A

|  | Example | | |
|---|---|---|---|
|  | F-23a | F-23b | F-23c |
| dye of formula (6), wherein X⁻ is acetate* | 20 g | | |
| dye of formula (7), wherein X⁻ is chloride* |  | 20 g | |
| dye of formula (4), wherein X⁻ is *chloride, |  |  | 20 g |
| oil of parafine | 3 g | 3 g | 3 g |
| cationic polymeric powder (Merquat 280 Dry de Calgon) | 10 g | 10 g | 10 g |
| sawdust | 100 g | 100 g | 100 g |

*the dyes are present in powder form

COMPOSITION B:

| hydrogenperoxide 20% by volume | 100 g |
|---|---|

Directly before the dyeing a mixture of 1 equivalent of weight of Composition (A), and 1 equivalent of weight of composition (B) are mixed. The pH of the mixture is adjusted to 9.8 with 20 vol. % ammonia. The dyeing mixture is applied on undamaged human grey hair and allowed to act thereon for 30 minutes. After the contact period the strand is rinsed, shampooed and dried.

Example F-22a

A strong alkaline 10% solution of a non-ionic surfactant (Plantaren 2000, Henkel) is adjusted to pH 9.5 using citric acid. 0.1% of the dye of formula (104) is dissolved therein and a strand of human hair, bleached white, is treated with that dye solution at 293K. After a short time the strand has been dyed to a blue shade, which is still very intensive even after shampooing ten times. The dye has a strong affinity to undamaged hair. In this case, too, the wash fastness is very good. The light fastness on damaged and undamaged hair is excellent. The perm fastness on un- and damaged hair is very good as well.

Example F-22b

The dye of formula (104) is replaced by the dye of formula (101a) to give a bluish-red shade which is still very intensive even after shampooing ten times,

Example F-23a

A 10% solution of a non-ionic surfactant (Plantaren 2000, Henkel) is adjusted to pH 5.5 using citric acid. 0.1% of the dye of formula (105) is dissolved therein and a strand of middle blonde undamaged human hair is treated with the dye solution at room temperature. After a short time the strand has been dyed to a red shade, which has a good wash, perm and light fastness properties.

Example F-23b

The dye of formula (105) is replaced by the dye of formula (110) to give a bluish shade, which has good wash, perm and light fastness.

Example F-24a

A dye emulsion containing
0.1% of the dye of formula (107),
3.5% cetearyl alcohol,
1.0% ceteareth 80,
0.5% glyceryl mono-di-stearate,
3.0% stearamide DEA,
1.0% stearamphopropyl sulfonate,
0.5% polyquarternium-6, and
water ad 100%, is applied to bleached human hair at room temperature for 30 minutes and rinsed. A very attractive blue dyeing with good fastness properties is obtained.

Example F-24b

The dye of formula (107) is replaced by the dye of formula (106) to give a vibrant blue dyeing with good fastness properties.

Example F-25

Dye following dye emulsions with pH=9.8 are prepared:

| Composition | Example | | | |
|---|---|---|---|---|
|  | F-25a | F-25b | F-25c | F-25d |
| dye of formula (101a) | 0.5 | | | |
| dye of formula (104), | | 0.5 | | |
| dye of formula (108) | | | 0.5 | |
| dye of formula (109) | | | | 0.5 |
| cetylstearylalcohol | 11.0 | 11.0 | 11.0 | 11.0 |
| oleth-5 | 5.0 | 5.0 | 5.0 | 5.0 |
| oleic acid | 2.5 | 2.5 | 2.5 | 2.5 |
| stearic acid monoethanolamide | 2.5 | 2.5 | 2.5 | 2.5 |
| coco fatty acid monoethanolamide | 2.5 | 2.5 | 2.5 | 2.5 |
| sodium laurylsuphate | 1.7 | 1.7 | 1.7 | 1.7 |
| 1,2-propanediol | 1.0 | 1.0 | 1.0 | 1.0 |
| ammoniumchloride | 0.5 | 0.5 | 0.5 | 0.5 |
| EDTA, tetrasodium salt | 0.2 | 0.2 | 0.2 | 0.2 |
| perfume | 0.4 | 0.4 | 0.4 | 0.4 |
| cornproteinhydrolysate | 0.2 | 0.2 | 0.2 | 0.2 |
| Silica | 0.1 | 0.1 | 0.1 | 0.1 |

The compositions F-25a, F-25b, F-25c and F-25d are each mixed with the same weight of a 6% hydrogen peroxide solution. The mixtures are directly applied to a tress of brown hair. After 30 minutes the tress is rinsed, shampooed, rinsed again and dried. Dyeings with a blue shade are obtained.

Example F-26a

A strong alkal. 10% solution of a non-ionic surfactant (Plantaren 2000, Henkel) is adjusted to pH 9.5 using citric acid. 0.2% of the dye of formula (111) and 0.1% of the dye formula (110) are dissolved therein and a strand of middle blonde undamaged human hair is treated with the dye solution at room temperature.

After 10 minutes the strand has been dyed to a blue shade, which has a good wash, perm and light fastness.

Example F-26b

The dye of formula (111) is replaced by the dye of formula (101a) and the dye of formula (111) is replaced by the dye of formula (105).

A dyeing with an intensive blue shade having good wash, perm and light fastness is obtained.

Example F-27

A strong alkal. 10% solution of a non-ionic surfactant (Plantaren 2000, Henkel) is adjusted to pH 9.5 using citric acid.

0.2% of the dye of formula (106) and 0.1% of the dye formula

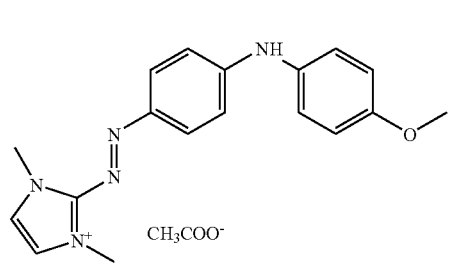
(F-27)

are dissolved therein.

A strand of dark blonde undamaged human hair is treated with the dye solution at room temperature.

After 20 minutes the strand has been dyed to a violet shade which has good wash, perm and light fastness properties.

Example F-28

A strand of bleached human hair is treated with 10 g of a dye composition having a pH of 9.8, comprising 5 g of a 6% hydrogen peroxide solution and 5 g of the composition A:

| Composition A | |
|---|---|
| oleic acid | 10.0 |
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | Ad 100 |

After 15 minutes 10 g of a 12.5% citric acid gel comprising the dye of formula (106) are applied on the hair and combed, so that the hair has a pH of 7.

After 15 minutes the hair is washed with water, rinsed and dried.

The strand has been dyed to a blue shade, which has a good wash and light fastness.

Example F-29

A strand of middle blonde human hair is dyed with 10 g of a composition having a pH of 9.8, which is obtained by mixing 5 g of 6% hydrogen peroxide solution and 5 g of the composition A of Example F-28.

After treatment of 15 minutes the pH of the hair is adjusted to 5 by addition of citric acid.

Then 5 g of a 12.5% citric acid gel comprising the dye of formula (106) are applied on the hair and combed, so that the hair has a pH of 7.

After 15 minutes the hair is washed with water, rinsed and dried.

The strand has been dyed to a blue shade, which has good wash and light fastness properties.

Example F-30a

A strand of bleached blond hair is treated with a composition comprising 5 g of a 6% hydrogenperoxide solution and 5 g a composition comprising an oxidation base with a pH value of 9.8 as given below:

| Composition comprising an oxidation base with a pH value of 9.8 | |
|---|---|
| oleic acid | 10.0 |
| toluene-2,5-diamine sulfate | 0.07 |
| resorcinol | 0.02 |
| 2-amino-6-chloro-4-nitrophenol | 0.01 |
| 4-amino-m-cresol | 0.03 |
| 2-amino-3-hydroxypyridine | 0.001 |
| sodium sulfite | 1.0 |
| ascorbinic acid | 0.5 |
| water | ad 100 |

After 15 minutes the pH of the hair is adjusted to 5 by addition of citric acid. Then 5 g of a 12.5% citric acid gel comprising 0.1% of te dye of formula (101a) are applied on the hair and combed, so that the hair has a pH of 7. After 15 minutes the hair is washed with water, rinsed and dried.

The strand has been dyed to an intensive shade, which has a good wash and light fastness properties.

Example F-30b

The dye of formula (101a) is replaced by the dye of formula (103).

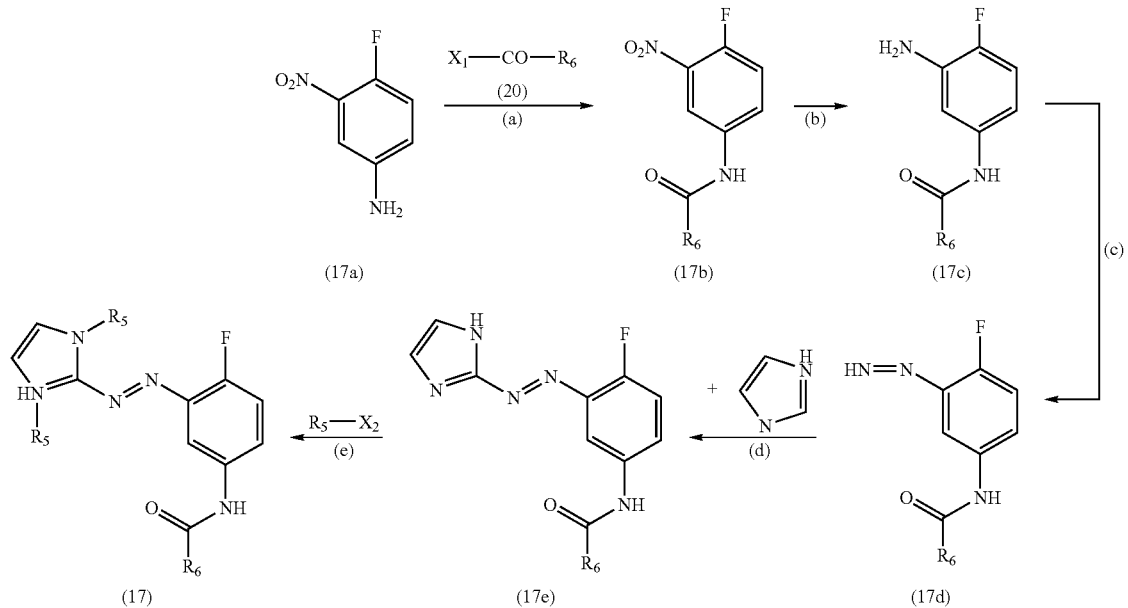

The invention claimed is:

1. Dye of formula

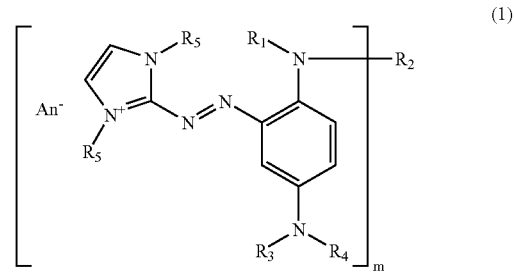
(1)

wherein $R_1$ is hydrogen; $C_1$-$C_{14}$alkyl; hydroxy-$C_1$-$C_{14}$alkyl; $C_2$-$C_{14}$alkenyl; a radical of formula (1a) —$(CH_2)_{n1}$—O—$(CH_2)_{n2}$—$CH_3$; a radical of formula (1b)

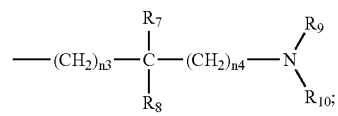

$C_6$-$C_{10}$aryl; or $C_6$-$C_{10}$aryl-$C_1$-$C_6$alkyl;

$R_3$ is hydrogen; $C_1$-$C_{14}$alkyl; $C_2$-$C_{14}$alkenyl; $C_6$-$C_{10}$aryl; $C_6$-$C_{10}$aryl-$C_1$-$C_6$alkyl; or CO—$R_6$;

$R_4$ is CO—$R_6$;
$R_5$ is $C_1$-$C_{14}$alkyl; $C_2$-$C_{14}$alkenyl; $C_6$-$C_{10}$aryl; or $C_6$-$C_{10}$aryl-$C_1$-$C_6$alkyl;
$R_6$ is hydrogen; $C_1$-$C_{14}$alkyl; $C_2$-$C_{14}$alkenyl; or $C_6$-$C_{10}$aryl;
$R_7$, $R_8$, $R_9$ and $R_{10}$, independently from each other are hydrogen; or $C_1$-$C_5$alkyl;
m is 1; or 2;
An⁻ is an anion;
If m=1,
$R_2$ is hydrogen; $C_1$-$C_{14}$alkyl; $C_2$-$C_{14}$alkenyl; a radical of formula (1a); a radical of formula (1b); $C_6$-$C_{10}$aryl; or $C_6$-$C_{10}$aryl-$C_1$-$C_6$alkyl;
If m=2,
$R_2$ is the direct bond; or $C_1$-$C_{14}$alkylene, which is optionally substituted by one or more $C_1$-$C_4$alkyl, or which is optionally interrupted by $C_5$-$C_{10}$arylene, —O— or —$NR_9R_{10}$—;
$R_9$ and $R_{10}$, independently from each other are hydrogen; or $C_1$-$C_5$alkyl; and
n1, n2, n3 and n4, independently from each other are a number from 0 to 5.

2. Dye according to claim 1, wherein
the anion is is selected from a halide, sulfate, hydrogen sulfate, phosphate, boron tetrafluoride, carbonate, bicarbonate, oxalate or $C_1$-$C_8$alkyl sulfate, lactate, formate, acetate, propionate and a complex anion.

3. Dye according to claim 1, wherein
$R_1$ is hydrogen; or $C_1$-$C_{14}$alkyl;
$R_3$ is hydrogen; or $C_1$-$C_{14}$alkyl;
$R_4$ is CO—$R_6$;
$R_5$ is $C_1$-$C_{14}$alkyl;
$R_6$ is hydrogen; $C_1$-$C_{14}$alkyl; or $C_6$-$C_{10}$aryl;
m is 1; or 2;
An⁻ is an anion;
If m=1,
$R_2$ is hydrogen; $C_1$-$C_{14}$alkyl; hydroxy-$C_1$-$C_{14}$alkyl a radical of formula (1a); or a radical of formula (1b);
if m=2,
$R_2$ is the direct bond; or $C_1$-$C_{12}$alkylene, which is optionally substituted by one or more $C_1$-$C_4$alkyl or interrupted by —O—, or $NR_9R_{10}$; and
$R_9$ and $R_{10}$ independently from each other are hydrogen; or $C_1$-$C_5$alkyl.

4. Dye according to claim 1, which correspond to formula

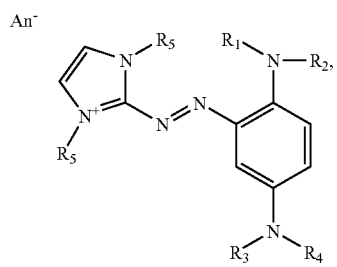

(2)

wherein
$R_1$ is hydrogen; or $C_1$-$C_{14}$alkyl;
$R_2$ is hydrogen; $C_1$-$C_{14}$alkyl; a radical of formula (1a); or a radical of formula (1b);
$R_3$ is hydrogen; or $C_1$-$C_{14}$alkyl;
$R_4$ is CO—$R_6$;
$R_5$ is $C_1$-$C_{14}$alkyl;
$R_6$ is hydrogen; $C_1$-$C_{14}$alkyl; or $C_6$-$C_{10}$aryl; and
An⁻ is an anion.

5. Dye according to claim 4, wherein
$R_1$ is hydrogen; or $C_1$-$C_4$alkyl;
$R_2$ is $C_1$-$C_{14}$alkyl; a radical of formula (1a); or a radical of formula (1b);
An⁻ is an anion;
$R_3$ is hydrogen; or $C_1$-$C_4$alkyl;
$R_4$ is CO—$R_6$;
$R_5$ and $R_6$ independently from each other are is $C_1$-$C_4$alkyl.

6. Dye according to claim 4, wherein
$R_1$ is hydrogen; or $C_1$-$C_4$alkyl;
$R_2$ is $C_1$-$C_{12}$alkyl; a radical of formula (1a); or a radical of formula (1b);
An⁻ is an anion;
$R_3$ is hydrogen; $C_1$-$C_4$alkyl; o
$R_4$ is CO—$CH_3$; and
$R_5$ is $C_1$-$C_4$alkyl.

7. Dye according to claim 1 which correspond to formula

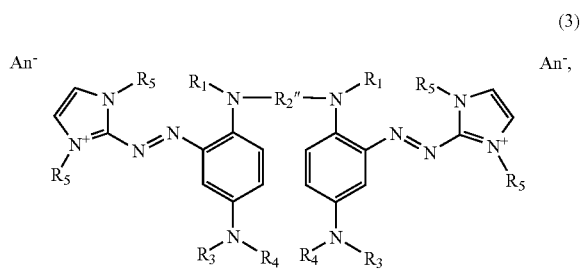

(3)

wherein
$R_1$ is hydrogen; or $C_1$-$C_{14}$alkyl;
$R_2$ is the direct bond; or $C_1$-$C_{12}$alkylene, which is optionally substituted by one or more $C_1$-$C_4$alkyl or interrupted by —O—, or $NR_9R_{10}$;
$R_3$ is hydrogen; or $C_1$-$C_{14}$alkyl;
$R_4$ is CO—$R_6$;
$R_5$ is $C_1$-$C_{14}$alkyl;
$R_6$ is hydrogen; $C_1$-$C_{14}$alkyl; or $C_6$-$C_{10}$aryl; and
An⁻ is an anion.

8. Dye according to claim 7, wherein
$R_1$ is hydrogen; or $C_1$-$C_4$alkyl;
$R_2$ is the direct bond; or $C_1$-$C_8$-alkylene, which is optionally substituted by one or more $C_1$-$C_4$alkyl or interrupted by —O—, or $NR_9R_{10}$;
$R_3$ is hydrogen; or $C_1$-$C_4$alkyl;
$R_4$ is CO—$R_6$;
$R_5$ is $C_1$-$C_4$alkyl;
$R_6$ is $C_1$-$C_4$alkyl;
$R_9$ and $R_{10}$ independently from each other are hydrogen; or $C_1$-$C_5$alkyl; and
An⁻ is an anion.

9. Dye according to claim 7, wherein
$R_1$ is hydrogen; or $C_1$-$C_4$alkyl;
$R_2$ is is the direct bond; or $C_1$-$C_8$-alkylene, which is optionally substituted by one or more $C_1$-$C_4$alkyl or interrupted by —O—, or $NR_9R_{10}$;
$R_3$ is hydrogen; or $C_1$-$C_4$alkyl;
$R_4$ is CO—$CH_3$;
$R_5$ is $C_1$-$C_4$alkyl;
$R_9$ and $R_{10}$ independently from each other are hydrogen; or $C_1$-$C_5$alkyl; and
An⁻ is an anion.

10. Dye according to claim 1 of formula
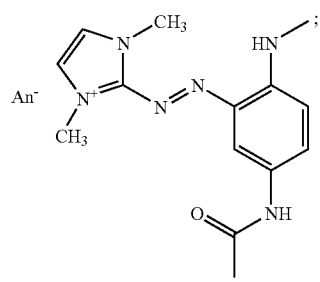 (4)
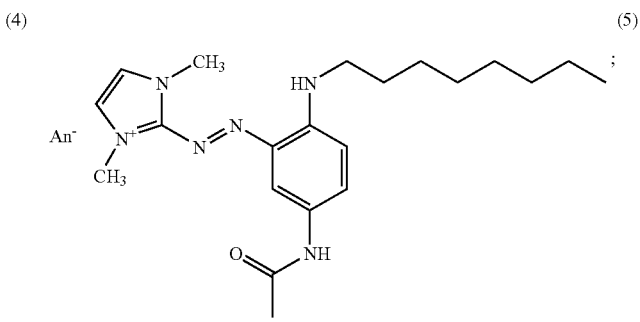 (5)
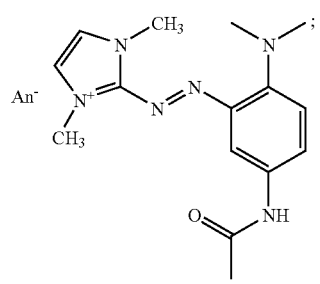 (6)
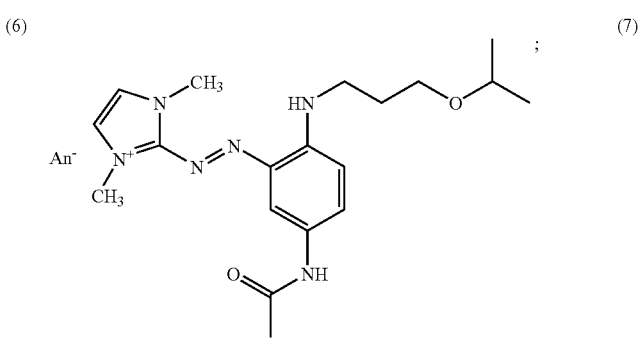 (7)
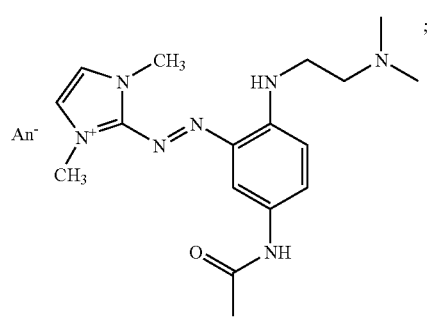 (8)
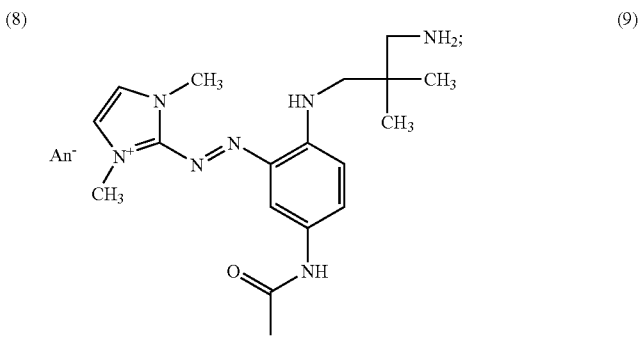 (9)
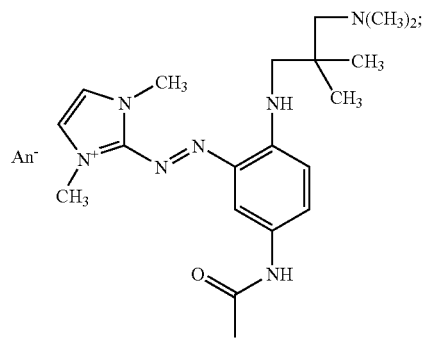 (10)
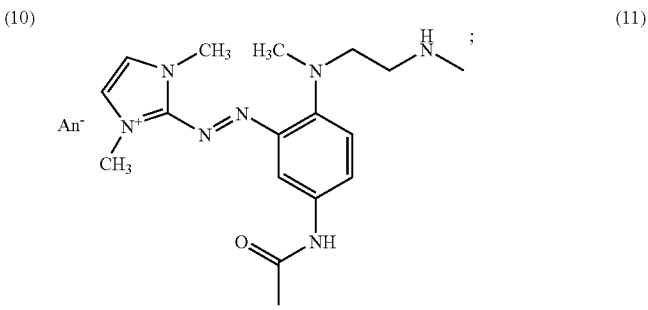 (11)

(12)
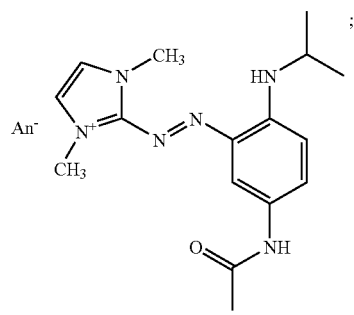
(13)
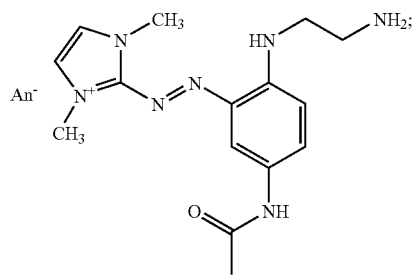
(14)
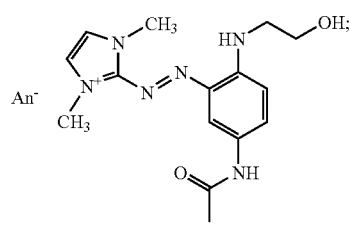
(15)
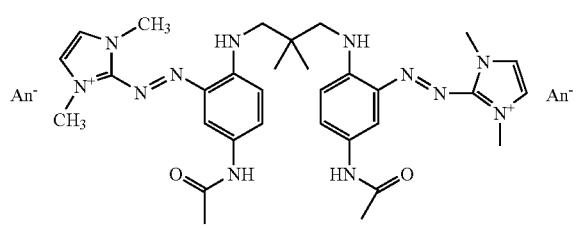
(16)
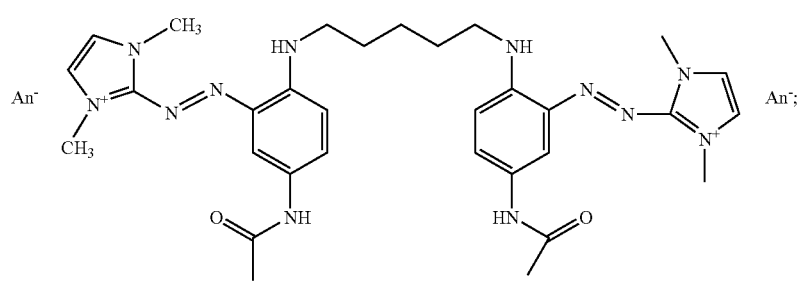
(17)
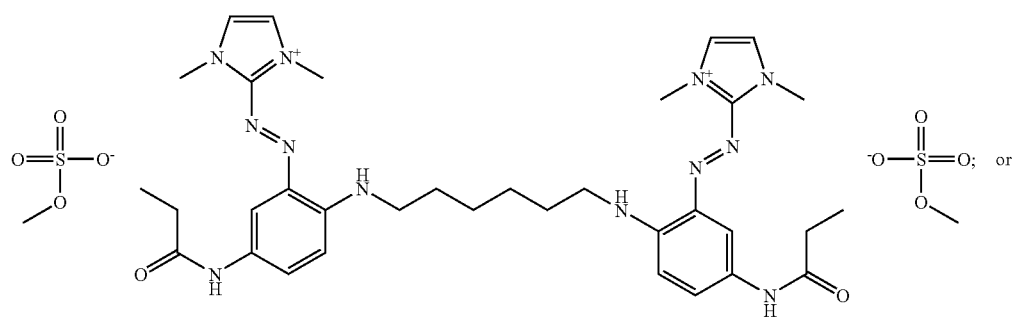
or -continued

(18)
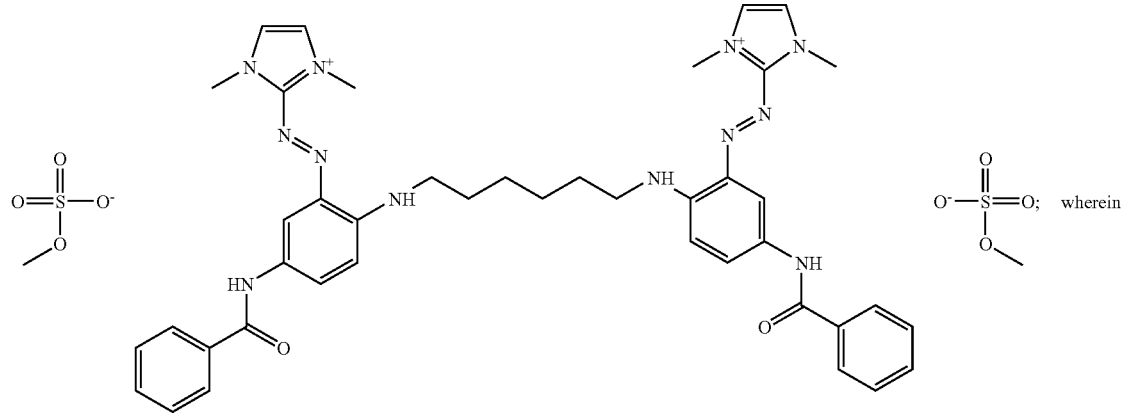
wherein

An⁻ is an anion.

11. A dye of formula

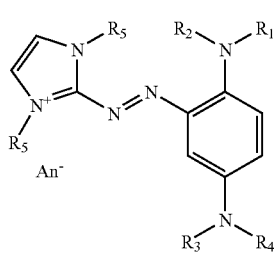

wherein
$R_1$ and $R_2$ are each independently of the other hydrogen; or unsubstituted or substituted $C_1$-$C_{14}$alkyl, allyl or aralkyl, or
$R_1$ is hydrogen, or unsubstituted or substituted $C_1$-$C_{14}$alkyl, allyl or aralkyl, and
$R_2$ is substituent of formula

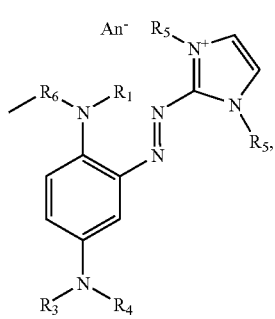

wherein
$R_6$ is unsubstituted or substituted $C_1$-$C_{14}$alkylen; and
$R_3$ is hydrogen or an unsubstituted or substituted $C_1$-$C_{14}$alkyl, allyl, aralkyl or CO—$R_1$;
$R_4$ is CO—$R_9$;

$R_5$ is unsubstituted or substituted $C_1$-$C_{14}$alkyl, allyl or aralkyl;

$R_9$ is hydrogen; or unsubstituted or substituted $C_1$-$C_{14}$alkyl, allyl or aralkyl; and An⁻ is an anion.

12. A process for the preparation of dyes of formula (1) as defined in claim 1, which process comprises reacting a dye of formula (17) with an amine of formula (18) to give a compound of formula (1) according to the following reaction scheme:

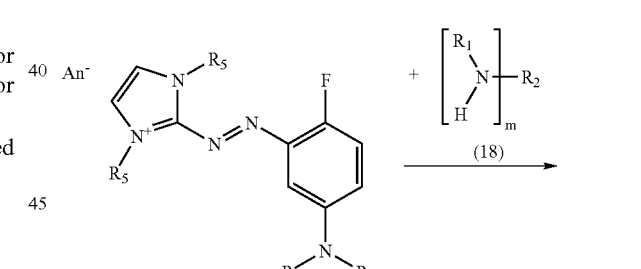

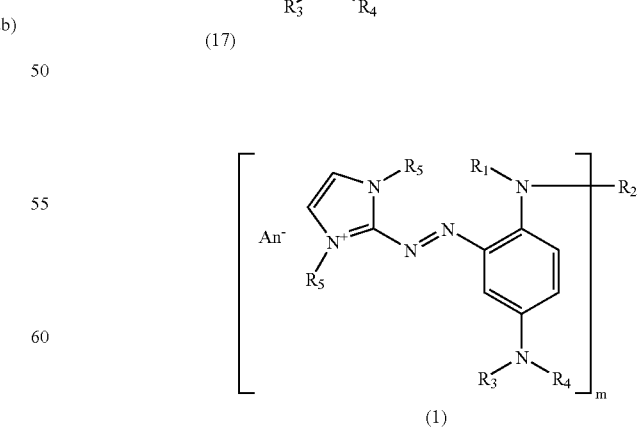

wherein
$R_1$, $R_2$, $R_3$, $R_4$, $R_5$, m and An⁻ are defined as in claim 1.

13. Process for the preparation of dye of formula (17)

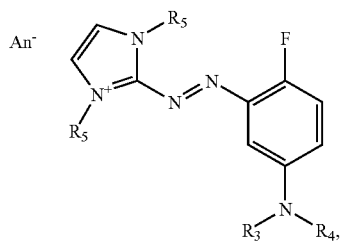

wherein
$R_3$ is hydrogen; and
$R_4$ is CO—$R_6$, which process comprises
(a) acylating a 4-fluoro-3-nitroanil of formula (17a) with an acylating agent of formula (20),
(b) reducing the nitro group in formula (17b) to the amino group to give the compound of formula (17c),
(c) diazotizing the compound of formula (17c) to give the compound of formula (17d),
(d) coupling the diazotized compound of formula (17d) with imidazole to give the compound of formula (17e), and
(e) alkylating the compound of formula (17e) with an alkylating agent to give the compound of formula (17), according to the following reaction scheme:

wherein $R_3$ is hydrogen; $C_1$-$C_{14}$alkyl; $C_2$-$C_{14}$alkenyl; $C_8$-$C_{10}$aryl; $C_6$-$C_{10}$aryl-$C_1$-$C_6$alkyl; or CO—$R_6$;

$R_4$ is CO—$R_6$;

$R_5$ is $C_1$-$C_{14}$alkyl; $C_2$-$C_{14}$alkenyl; $C_6$-$C_{10}$aryl; or $C_6$-$C_{10}$aryl-$C_1$-$C_6$alkyl;

$R_6$ is hydrogen; $C_1$-$C_{14}$alkyl; $C_2$-$C_{14}$alkenyl; or $C_6$-$C_{10}$aryl; and $X_1$ and $X_2$ are halogen.

14. A composition comprising at least one dye of formula (1) as defined in claim 1.

15. A composition according to claim 14 comprising in addition at least one single further direct dye and/or an oxidative agent.

16. A composition according to claim 14 comprising in addition at least one single oxidative dye and/or; at least one single oxidative dye and an oxidative agent.

17. A composition according to claim 14 in the form of a shampoo, a conditioner, a gel or an emulsion.

18. A method of dyeing an organic material, which comprises treating the organic material with at least one dye of formula (1) according to claim 1.

19. A method according to claim 18, which comprises treating the organic material with at least one dye of formula (1) and an oxidative agent and, optionally, a further direct dye.

20. A method according to claim 18, which comprises treating the organic material with at least one compound of formula (1) and at least one single oxidative dye, or treating the organic material with a dye of formula (1) and at least one single oxidative dye and an oxidative agent.

21. A method according to any of claim 18 wherein the organic material is selected from keratin-containing fibers.

22. A method according to claim 21 wherein the keratin-containing fiber is human hair.

* * * * *